United States Patent
Ueno et al.

(10) Patent No.: US 8,988,743 B2
(45) Date of Patent: Mar. 24, 2015

(54) DOCUMENT DETECTING APPARATUS, IMAGE FORMING APPARATUS AND DOCUMENT DETECTING METHOD

(75) Inventors: Sueo Ueno, Shizuoka-ken (JP); Mitsuru Hatano, Kanagawa-ken (JP); Katsuya Nagamochi, Tokyo (JP); Hiroyuki Shiraishi, Shizuoka-ken (JP); Yusuke Hashizume, Chiba-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 497 days.

(21) Appl. No.: 13/270,096

(22) Filed: Oct. 10, 2011

(65) Prior Publication Data

US 2012/0092733 A1    Apr. 19, 2012

Related U.S. Application Data

(60) Provisional application No. 61/393,317, filed on Oct. 14, 2010, provisional application No. 61/393,320, filed on Oct. 14, 2010, provisional application No. 61/393,324, filed on Oct. 14, 2010, provisional application No. 61/393,325, filed on Oct. 14, 2010, provisional application No. 61/393,326, filed on Oct. 14, 2010, provisional application No. 61/393,328, filed on Oct. 14, 2010, provisional application No. 61/393,330, filed on Oct. 14, 2010, provisional application No. 61/393,331, filed on Oct. 14, 2010, provisional application No. 61/393,332, filed on Oct. 14, 2010.

(51) Int. Cl.
| | | |
|---|---|---|
| H04N 1/04 | (2006.01) | |
| H04N 1/40 | (2006.01) | |
| H04N 1/00 | (2006.01) | |

(52) U.S. Cl.
CPC ....... *H04N 1/00681* (2013.01); *H04N 1/00694* (2013.01); *H04N 1/00705* (2013.01); *H04N 1/00755* (2013.01)
USPC .......... 358/488; 358/475; 358/486; 358/465; 358/445; 358/446; 358/449

(58) Field of Classification Search
CPC ........................... H04N 1/02815; H04N 1/193
See application file for complete search history.

(56) References Cited

U.S. PATENT DOCUMENTS

| | | | |
|---|---|---|---|
| 4,954,846 A * | 9/1990 | Matsuo et al. | 399/51 |
| 5,905,933 A * | 5/1999 | Murai | 399/376 |
| 2007/0201918 A1* | 8/2007 | Shoda et al. | 399/376 |
| 2009/0237751 A1* | 9/2009 | Ishido | 358/483 |

FOREIGN PATENT DOCUMENTS

| | | | |
|---|---|---|---|
| JP | 09-298638 | | 11/1997 |
| JP | 10-076705 | | 3/1998 |
| JP | 10-135440 | | 5/1998 |
| JP | 3151105 | | 4/2001 |
| JP | 2007124319 A | * | 5/2007 |

* cited by examiner

*Primary Examiner* — Cheukfan Lee
(74) *Attorney, Agent, or Firm* — Patterson & Sheridan LLP

(57) ABSTRACT

According to one embodiment, a document detecting apparatus includes a light-emitting element, a photoelectric conversion element, a light-emission controller and a detection processor. The light-emitting element projects light onto a detection position of a document. The light-emitting element is not used for reading an image of the document. The photoelectric conversion element converts light projected onto the detection position into an electric signal and outputs the electric signal. The light-emission controller changes the light quantity of the light emitted by the light-emitting element during a predetermined interval. The detection processor detects the presence or absence of the document at the detection position of the document based on whether a value of the output electric signal during the predetermined interval changes in correspondence to the change of the light quantity caused by the light-emission controller.

20 Claims, 14 Drawing Sheets

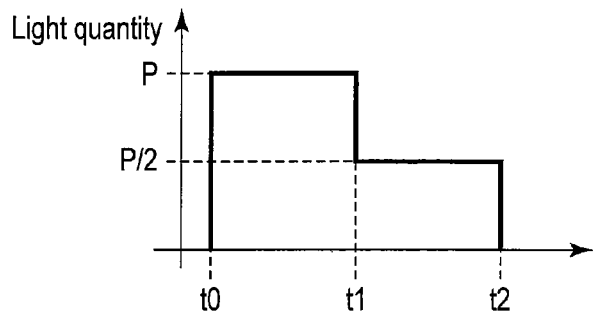
F I G. 1 7 A
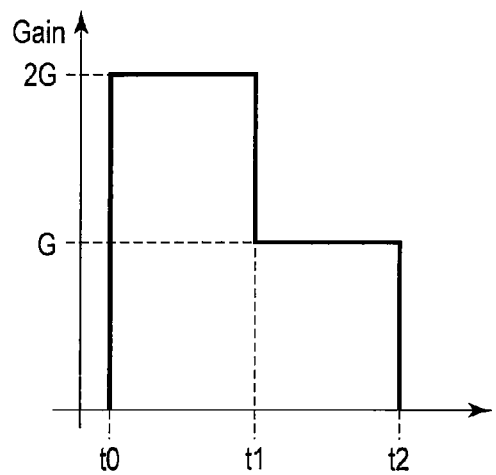
F I G. 1 7 B
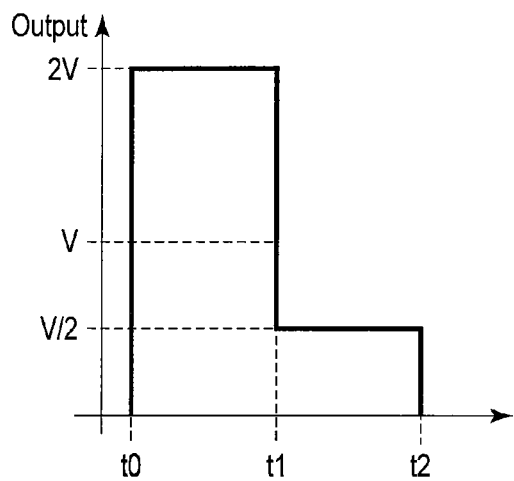
F I G. 1 7 C

DOCUMENT DETECTING APPARATUS, IMAGE FORMING APPARATUS AND DOCUMENT DETECTING METHOD

CROSS-REFERENCE TO RELATED APPLICATIONS

This application is based upon and claims the benefit of priority from U.S. Provisional Application No. 61/393,328 filed on Oct. 14, 2010; Provisional Application No. 61/393,330 filed on Oct. 14, 2010; Provisional Application No. 61/393,317 filed on Oct. 14, 2010; Provisional Application No. 61/393,320 filed on Oct. 14, 2010; Provisional Application No. 61/393,324 filed on Oct. 14, 2010; Provisional Application No. 61/393,325 filed on Oct. 14, 2010; Provisional Application No. 61/393,326 filed on Oct. 14, 2010; Provisional Application No. 61/393,331 filed on Oct. 14, 2010; Provisional Application No. 61/393,332 filed on Oct. 14, 2010, the entire contents of which are incorporated herein by reference.

FIELD

Embodiments described herein relate generally to a document detecting apparatus, an image forming apparatus and a document detecting method.

BACKGROUND

For example, a scanner provided in a multi function peripherals includes a document detecting apparatus to detect the presence or absence of a document and the size of the document. The document detecting apparatus detect the presence or absence of the document based on a signal of a reflection-type or transmission-type sensor. For example, the reflection-type or transmission-type sensor projects light for detecting the presence or absence of a document onto a detection position, and detects the presence or absence of the document based on an output value obtained by converting the light received from the detection position. However, when the sensor receives stray light other than the light projected to detect the presence or absence of the document, erroneous detection on the presence or absence of the document can occur. A document detecting apparatus is desired which discriminates the stray light and can detect the presence or absence of a document at high accuracy.

BRIEF DESCRIPTION OF THE DRAWINGS

FIG. 17A is a view showing the light quantity of projected light in a tenth document detecting process.

FIG. 17B is a view showing a gain of an amplifier in the tenth document detecting process.

FIG. 17C is a view showing an output value obtained by amplifying an output of a photo acceptance element receiving the light having the light quantity shown in FIG. 17A by the amplifier having the gain shown in FIG. 17B.

DETAILED DESCRIPTION

In general, according to one embodiment, a document detecting apparatus includes a light-emitting element, a photoelectric conversion element, a light-emission controller and a detection processor. The light-emitting element projects light onto a detection position of a document. The photoelectric conversion element outputs an electric signal obtained by converting the light from the detection position of the document. The light-emission controller changes the light quantity of the light emitted by the light-emitting element. The detection processor detects the presence or absence of the document at the detection position of the document based on the presence or absence of a change of an output value corresponding to the change of the light quantity caused by the light-emission controller in an output value from the photoelectric conversion element.

Hereinafter, embodiments will be described in detail with reference to the drawings.

Figure 1:
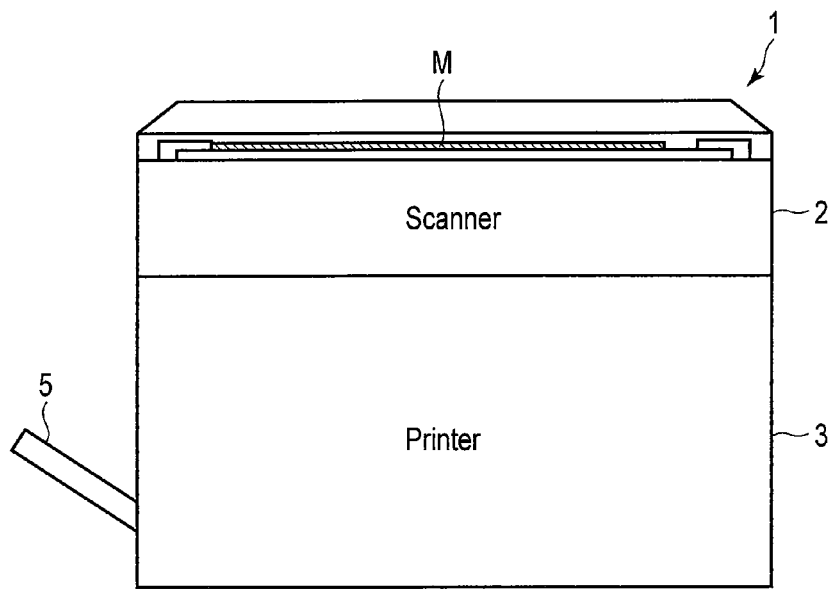
FIG. 1 is a view schematically showing a structural example of a multi function peripherals.

FIG. 1 is a view showing a structural example of a multi function peripherals (MFP) 1 as an example of an image forming apparatus 1 of an embodiment. The multi function peripherals 1 shown in FIG. 1 includes a scanner 2 and a printer 3. The scanner 2 functions as an image reading apparatus to read an image of a document surface. The scanner 2 converts the image of the document surface into image data. The printer 3 prints the image on an image forming target medium. For example, the multi function peripherals 1 realizes a copy function by printing the image of the document surface read by the scanner 2 onto the image forming target medium by the printer 3.

The scanner 2 reads the image of the document surface placed at a specified position. The scanner 2 optically scans the document surface, and reads the image of the document M as image data. For example, when the image of the document surface is printed (copied) onto a sheet, the image data of the document surface read by the scanner 2 is transmitted to the printer 3. The printer 3 forms the image on the sheet as an image forming target medium based on the supplied image data. The printer 3 outputs the sheet on which the image was formed to a paper discharge tray 5.

Next, a structure of the scanner 2 will be described.

Figure 2:
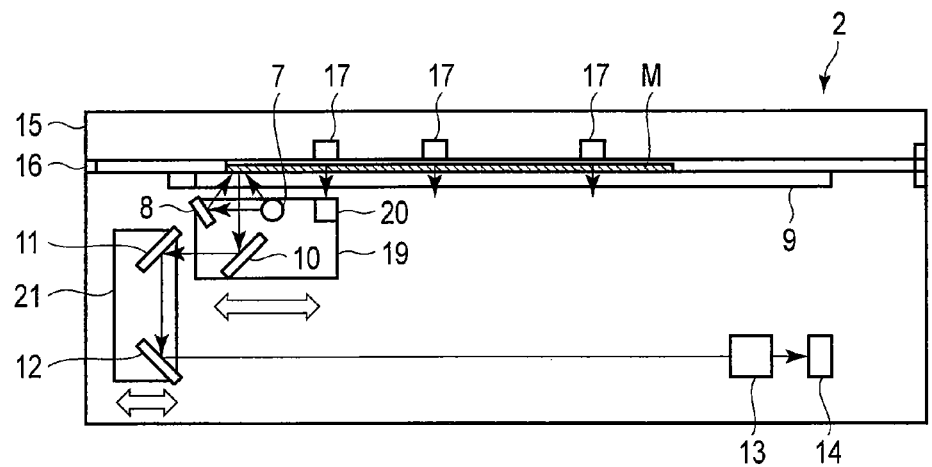
FIG. 2 is a view schematically showing a structural example of a scanner.

FIG. 2 is a view schematically showing a structural example of the scanner 2 mounted in the multi function peripherals 1 as the image forming apparatus.

In the structural example of FIG. 2, the scanner (image reading apparatus) 2 includes a document table glass 9 on which a document as a reading object is placed. A document M is placed on the document table glass 9 while a specified position (for example, upper left) is made a reference. A light source 7 irradiates light to the document M placed on the document table glass 9. The light source 7 is made of, for example, a xenon lamp. A reflector 8 reflects the light from the light source 7 and irradiates the light to the document M placed on the document table glass 9.

A first mirror 10, a second mirror 11 and a third mirror 12 guide the reflected light from the document M on the document table glass 9 to a condensing lens 13. The condensing lens 13 condenses the light guided by the first mirror 10, the second mirror 11 and the third mirror 12, and forms an image on a CCD sensor 14. The CCD sensor 14 is made of a photoelectric conversion element to convert incident light into an electric signal.

A document table cover (platen cover) 15 fixes the document M placed on the document table glass 9. The platen cover 15 includes an reclosable mechanism. A switch 16 detects an open and close state of the platen cover 15A. For example, when the switch 16 is in an ON state, a detection is made that the platen cover 15 is in a closed state, and when the switch 16 is in an OFF state, a detection is made that the platen cover 15 is in an open state.

Besides, the scanner 2 having the structural example shown in FIG. 2 includes a document detecting apparatus to detect the presence or absence of a document on the document table glass 9 and the size of the document. The document detecting apparatus includes plural APS sensors for detecting the presence or absence of the document. The sensor (APS sensor) for detecting the document includes a light emitting element (hereinafter referred to also as a light emitting element) 17 and a photo acceptance (photoelectric conversion) element (hereinafter referred to also as a photo acceptance element) 20.

The APS sensor may be a transmission-type sensor or may be a reflection-type sensor. In the structural example shown in FIG. 2, an installation example of transmission-type APS sensors is shown. In the structural example shown in FIG. 2, light emitting elements 17 to emit light for detecting a document are respectively arranged at specified positions of a surface of the platen cover 15 at a side opposite to the document table glass 9, and photo acceptance elements (photoelectric conversion sensors) 20 are arranged in the first carriage 19 moving below the document table glass 9.

The first carriage 19 includes the light source 7, an inverter to drive the light source 7, the reflector 8, the first mirror 10 and the photo acceptance elements 20. The second carriage includes the second mirror 11 and the third mirror 12. The first carriage 19 moves so as to irradiate the light from the light source 7 to the whole surface of the document through the document table glass 9. The second carriage 21 moves at a half speed of the first carriage 19 and in the same direction as the first carriage 19.

The photo acceptance element (photoelectric conversion sensor) 20 mounted in the first carriage 19 receives the light from the light emitting element 17. The photo acceptance element 20 is arranged at the side of the document table glass 9 (that is, document surface side) in the first carriage 19. Besides, the photo acceptance element 20 is arranged at the front side of a document scanning (reading) position in a document scanning direction (image reading direction). The photo acceptance element 20 is arranged at the position where the light of the light emitting element 17 can be received before the image of the document M is read (at the front side in the image reading direction).

Next, a structure of a control system of the multi function peripherals 1 will be described.

Figure 3:
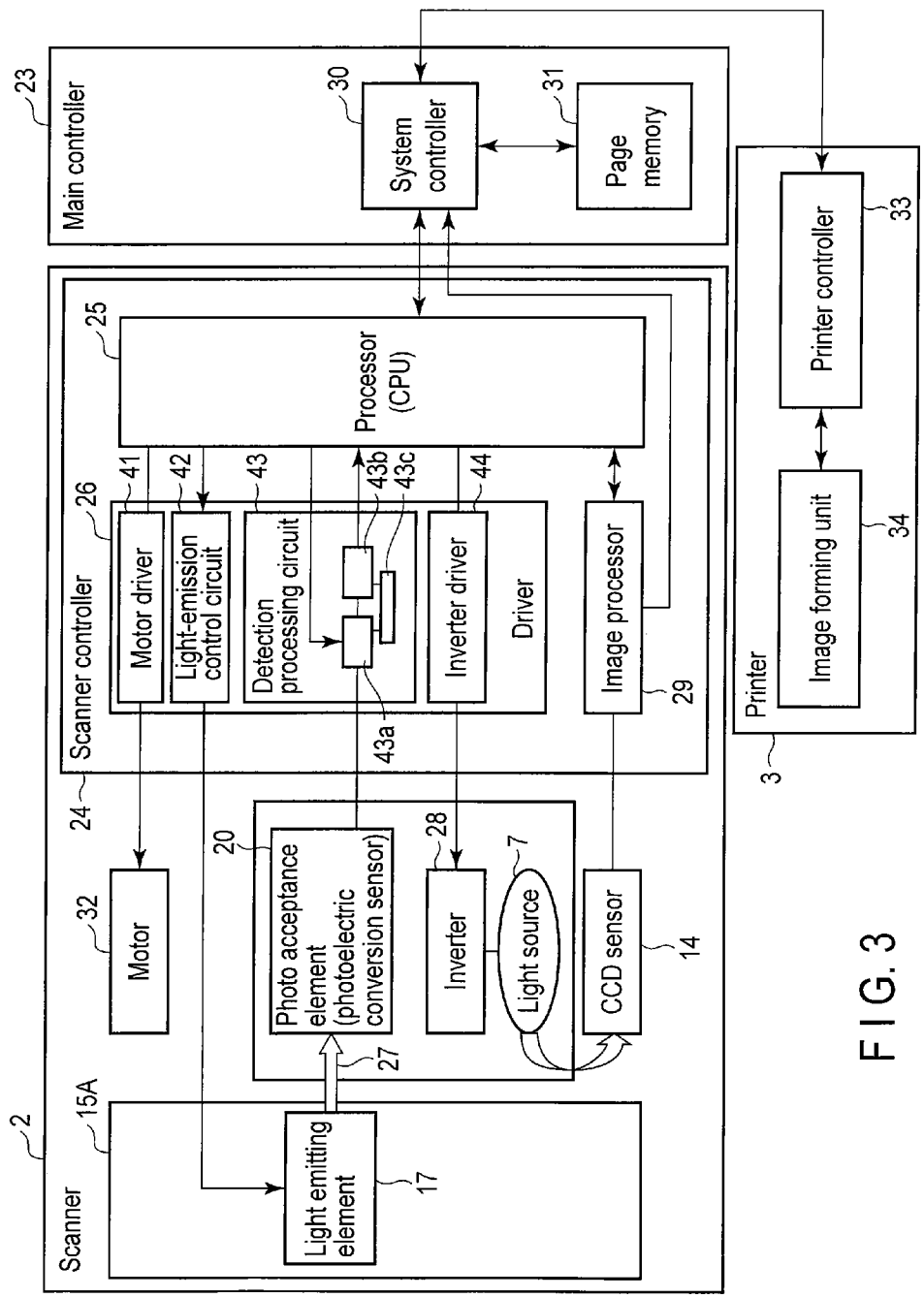
FIG. 3 is a block diagram showing a structural example of a control system of the multi function peripherals.

FIG. 3 is a block diagram showing a structural example of the control system of the multi function peripherals 1.

As shown in FIG. 3, the multi function peripherals 1 includes a main controller 23 to control the whole system including the scanner 2 and the printer 3. The main controller 23 is connected to the scanner 2 and the printer 3.

The main controller 23 includes a system controller 30 and a page memory 31. The system controller 30 includes a processor, a memory and various interfaces. The processor executes a program stored in the memory so that the system controller 30 integrally controls the whole system. For example, the system controller 30 outputs operation instructions to the scanner 2 and the printer 3. Besides, the system controller 30 controls to acquire image data as a read image from the scanner 2 or to output image data as an image for printing to the printer 3. The page memory 31 is a memory to store image data by the control of the system controller 30.

The scanner 2 includes a scanner controller 24. The scanner controller 24 includes a processor 25, a driver 26 and an image processor 29. The processor 25 is, for example, a CPU (Central Processing Unit). The processor 25 executes a program stored in a memory, and executes various arithmetic processing. The image processor 29 processes image data outputted from the CCD sensor 14.

The driver 26 includes various drivers such as a motor driver 41 to drive a motor 32 for various driving systems, a light-emission controller 42 to drive the photo acceptance element (photoelectric conversion sensor) 20, a detection processor 43 to process a detection signal from the photo acceptance element 20, and an inverter driver 44 to drive an inverter 28 for lighting the light source 7. Incidentally, the light-emission controller 42 and the detection processor 43 function as a driver for the APS sensor.

The first carrier 19 and the second carriage 21 are moved by the motor 32 which is driven by the motor driver 41 controlled by the processor 25. When an image on the whole surface of the document M is read, the processor 25 causes the first carriage 19 to move below the document M on the document table glass 9, so that the whole document surface is optically scanned.

The second carriage 21 moves at a half speed of the speed of the first carriage 19 and in the same direction, so that the light path length from the document surface to the CCD sensor 14 is always kept constant. In a standby state, the first carriage 19 stands by at a scanning origin position (home position) in a sub-scanning direction.

When a document on the document table glass 9 is detected, the processor 25 of the scanner 2 uses the light-emission controller 42 and causes the light emitting element 17 arranged on the back surface of the platen cover 15 to emit light for document detection. After the light emitting element 17 emits the light for detecting the presence or absence of the document, the processor 25 uses the motor driver 41 and causes the first carriage 19 to move in the sub-scanning direction.

The light-emission controller 42 controls the light quantity of the light emitted by the light emitting element 17. The photo acceptance element (photoelectric conversion sensor) 20 converts the received light to an electronic signal. The photo acceptance element 20 is arranged to receive the light emitted by the light emitting element 17 to the detection position. In the structural example shown in FIG. 2, the photo acceptance element 20 is mounted in the first carriage 19. The photo acceptance element (photoelectric conversion sensor) 20 outputs an electric signal obtained by converting the received light to the detection processor 43 of the driver 26.

The detection processor 43 analyzes the output signals from the respective photo acceptance elements 20, and detects the presence or absence of the document at the respective detection positions on the document table glass 9. For example, the detection processor 43 includes an amplifier 43a, a processing circuit 43b, a timer 43c and the like. The processing circuit 43b is formed of, for example, a circuit including a comparator and the like. The detection processor 43 outputs signals indicating the presence or absence of the document at the respective detection positions to the processor 25. Incidentally, an example of a document detecting process using the detection processor 43 will be described later in detail.

The processor 25 detects the size of the document M placed on the document table glass 9 based on the information indicating the presence or absence of the document at the respective detection positions from the detection processor 43. The detection processor 43 may directly output the output signals from the respective photo acceptance elements 20 to the processor 25. In this case, the processor 25 determines the presence or absence of the document. Besides, the detection processor 43 is formed of the amplifier 43a, and amplifies the output signals from the respective photo acceptance elements 20, and the processor 25 may process the signals. In this case, the processor 25 determines the presence or absence of the document in view of the amplification factor of the detection processor 43.

Besides, when an image of a document surface placed on the document table glass 9 is read, the processor 25 drives and controls the inverter 28 by the inverter driver 44, and causes the light source 7 disposed in the first carriage 19 to emit light. The light emitted from the light source 7 is irradiated to the document surface on the document table glass 9 directly or after reflected by the reflector 8. The light reflected by the document surface is condensed by the condensing lens 13 through the first mirror 10, the second mirror 11 and the third mirror 12, and an image is formed on the CCD sensor 14. The output (image output) of the CCD sensor 14 is inputted to the image processor 29.

The image processor 29 processes the image data outputted from the CCD sensor 14 by performing signal processing such as A/D conversion and shading correction. The system controller 30 stores the image data subjected to the signal processing by the image processor 29 into the page memory 31. For example, the system controller 30 outputs the image data stored in the page memory 31 to the printer 3 as the need arises. Besides, the system controller 30 may output the image data stored in the page memory 31 to an external apparatus.

The printer 3 includes a printer controller 33 and an image forming unit 34. The printer controller 33 controls an image forming process of the image forming unit 34 in accordance with instructions from the system controller 30 of the main controller 23. The image forming unit 34 forms an image on an image forming target medium. The printer 3 may be any type of printer. For example, the printer 3 may be an electrophotographic printer, an ink-jet printer or a thermal transfer printer.

Next, a structural example of the sensor (APS sensor) constituting the document detecting apparatus will be described.

The APS sensor constituting the document detecting apparatus may be a transmission-type sensor or a reflection-type sensor. Here, as shown in FIG. 2, the APS sensor is assumed to be the transmission-type sensor including the light-emitting element (hereinafter referred to also as the light emitting element) 17 and the photo acceptance element (hereinafter referred to also as the photo acceptance element) 20, and a description will be made. Incidentally, even when the APS sensor is formed of the reflection-type sensor, the structure may be made such that the presence or absence of a document is detected at respective detection positions similar to those in the following description.

In the structural example shown in FIG. 2, the light emitting elements 17 are respectively arranged at plural specified positions on the surface (hereinafter referred to also as the back surface of the platen cover) of the platen cover 15 at the side of the document table glass 9. The light emitting elements 17 are installed to irradiate light for detecting a document perpendicularly to the surface of the document table glass 9 in the state where the platen cover 15 is closed.

Besides, in the structural example shown in FIG. 2, the photo acceptance elements 20 are arranged in the first carriage 19 moving below the document table glass 9 in the sub-scanning direction. The photo acceptance elements 20 are arranged in the first carriage 19 so that the photo acceptance elements pass through the detection positions to which the light emitting elements 17 irradiate the light. The photo acceptance element 20 receives the light emitted from the light emitting element 17 in order to detect the document on the document table glass 9, and output an electric signal indicating the light quantity of the received light.

Figure 4:
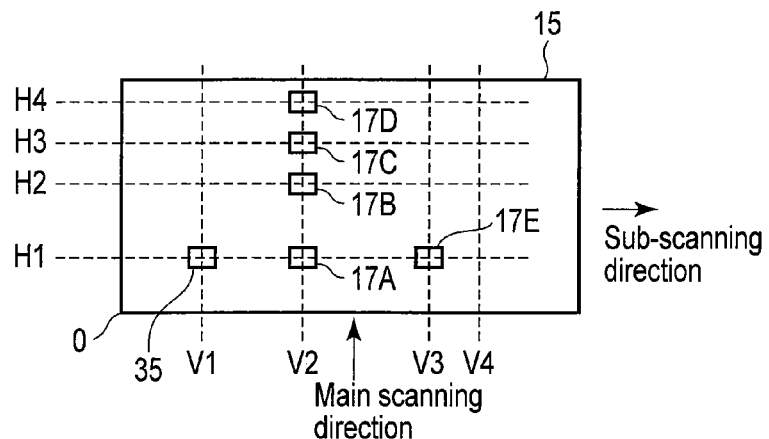
FIG. 4 is a view showing an arrangement example of document detecting sensors in the scanner.
Figure 5:
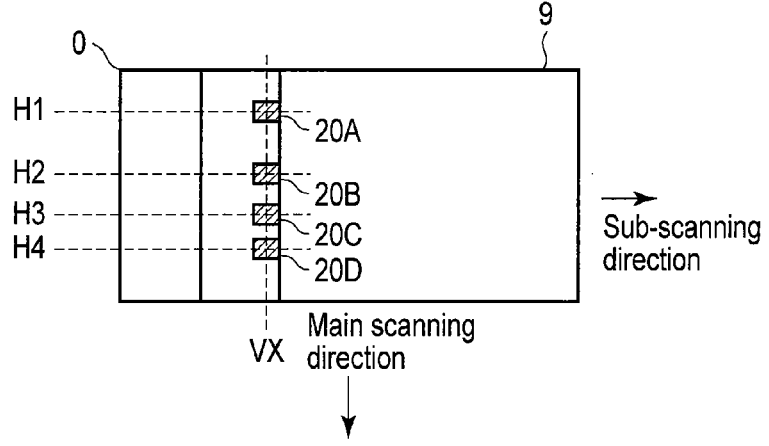
FIG. 5 is a view showing an arrangement example of document detecting sensors in the scanner.

FIG. 4 is a view showing a first arrangement example of the light emitting elements 17 (17A to 17E, 35) on the back surface of the platen cover 15. FIG. 5 is a view showing positions of the photo acceptance elements 20 (20A to 20D) mounted in the first carriage 19.

Here, FIG. 4 is a view showing the back surface of the platen cover 15. In FIG. 4, the right side of the platen cover 15 indicates the right side of the scanner 2, the lower side of the platen cover 15 indicates the rear side of the scanner 2, and the upper side of the platen cover 15 indicates the front side of the scanner 2. The sub-scanning direction in FIG. 4 is a direction from left to right. The main scanning direction in FIG. 4 is a direction from below to above. Further, a reference position O of document placement on the document table glass 9 is the lower left side of the platen cover 15 shown in FIG. 4.

Besides, FIG. 5 is a view showing the first carriage 19 when seen from above the document table glass 9. In FIG. 5, the right side of the first carriage 19 indicates the right side of the scanner 2, the lower side of the first carriage 19 indicates the front side of the scanner 2, and the upper side of the first carriage 19 indicates the rear side of the scanner 2. The sub-scanning direction in FIG. 5 is a direction from left to right. The main scanning direction in FIG. 5 is a direction from above to below. Further, in FIG. 5, the reference position O for document placement is the upper left side on the document table glass 9.

H1 to H4 shown in FIG. 4 and FIG. 5 denote positions in the main scanning direction (up and down direction in FIG. 4 and FIG. 5). Besides, V1 to V4 shown in FIG. 4 and VX shown in FIG. 5 denote positions in the sub-scanning direction (right and left direction in FIG. 4 and FIG. 5). In the following description, an intersection of V1 to V4 and H1 to H4 is denoted by VnHm (n and m is one of 1, 2, 3 and 4), and an intersection of VX (X is a variable) and H1 to H4 is denoted by VXHn (n is one of 1, 2, 3 and 4).

As shown in FIG. 4, the light emitting elements 17A to 17E as APS sensors for detecting the size of a document placed on the document table glass 9 are provided on the back surface of the platen cover 15. The light emitting elements 17A to 17E are respectively arranged at V2H1, V2H2, V2H3, V2H4 and V3H1. Further, the light emitting element 35 for detecting the presence or absence of a document on the document table glass 9 is also arranged on the back surface of the platen cover 15. The light emitting element 35 is arranged at the position of V1H1.

Besides, in the multi function peripherals 1, the light emitting elements 17 and the light emitting element 35 are paired with the photo acceptance elements 20 and constitutes transmission-type sensors (APS sensors). For example, the light emitting element 35 shown in FIG. 4 and the photo acceptance element 20A at VXH1 shown in FIG. 5 function as an APS sensor to detect the presence or absence of a document at V1H1 shown in FIG. 4. Besides, when the first carriage 19 is at a stand-by position (home position), when the photo acceptance element 20A is made to be located at a position facing the light emitting element 35 (that is, VX at the home position is made V1), the presence or absence of a document placed on the document table glass 9 can be immediately detected.

Besides, the light emitting element 17A shown in FIG. 4 and the photo acceptance element 20A at VXH1 shown in FIG. 5 function as the APS sensor to detect the presence or absence of a document at V2H1. The light emitting element 17B shown in FIG. 4 and the photo acceptance element 20B at VXH2 shown in FIG. 5 function as the APS sensor to detect the presence or absence of a document at V2H2. The light emitting element 17C shown in FIG. 4 and the photo acceptance element 20C at VXH3 shown in FIG. 5 function as the APS sensor to detect the presence or absence of a document at V2H3. The light emitting element 17D shown in FIG. 4 and the photo acceptance element 20D at VXH4 shown in FIG. 5 function as the APS sensor to detect the presence or absence of a document at V2H4. The light emitting element 17E shown in FIG. 4 and the photo acceptance element 20A at VXH1 shown in FIG. 5 function as the APS sensor to detect the presence or absence of a document at V3H1.

Figure 6:
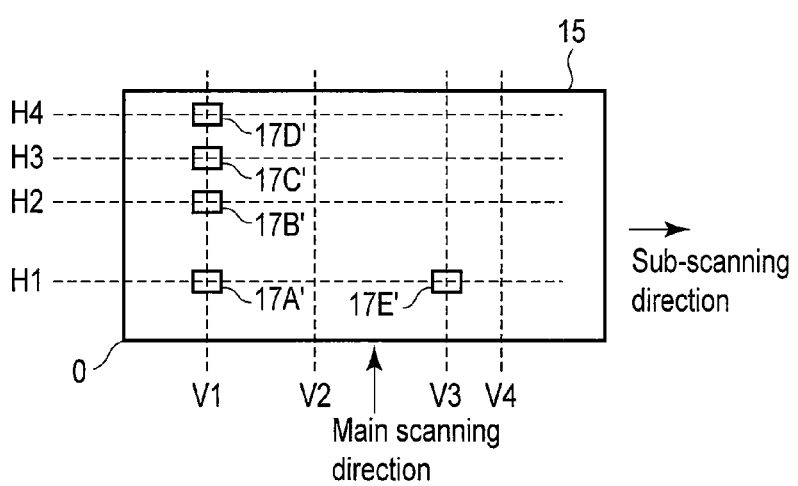
FIG. 6 is a view showing another arrangement example of document detecting sensors in the scanner.

FIG. 6 is a view showing a second arrangement example of the light emitting elements 17 (17A' to 17E') on the back surface of the platen cover 15. The photo acceptance elements 20 corresponding to the light emitting elements 17 of the second arrangement example shown in FIG. 6 may be ones arranged in the first carriage as shown in FIG. 5. That is, the document detecting apparatus can be realized by the APS sensors including the light emitting elements shown in FIG. 6 and the photo acceptance elements shown in FIG. 5.

In the second arrangement example shown in FIG. 6, the light emitting elements 17A' to 17E' are respectively arranged at V1H1, V1H2, V1H3, V1H4 and V3H1. The second arrangement example shown in FIG. 6 is different from the first arrangement example shown in FIG. 4 in that the light emitting element to detect only the presence or absence of a document is omitted, and the arrangement positions of the light emitting elements other than the light emitting element 17E in the sub-scanning direction are changed.

When the first carriage 19 is at the stand-by position (home position), when the photo acceptance elements 20A to 20D are made to be located at positions facing the light emitting elements 17A' to 17D' (that is, VX at the home position is made V1), even when the scanner 2 is in the stand-by state, the photo acceptance elements 20 can detect the presence or absence of a document placed on the document table glass 9. The respective light emitting elements 17 at V1H1, V1H2, V1H3 and V1H4 shown in FIG. 6 and the photo acceptance elements 20 at VXH1, VXH2, VXH3 and VXH4 shown in FIG. 5 are APS sensors for detecting the lateral width (length in the main scanning direction) of the document M placed on the document table glass 9 while the reference position O is made the reference.

Incidentally, the APS sensors including the light emitting elements 17 and 35 and the photo acceptance elements 20 are transmission-type sensors. The transmission-type sensor seldom performs erroneous detection even when the image of the document M as the read object has high density. Thus, the document detecting apparatus including the foregoing APS sensors can certainly detect the presence or absence of the document M, and can realize certain size detection irrespective of the kind of the document.

Besides, the APS sensors constituting the document detecting apparatus may be reflection-type sensors. For example, the reflection-type APS sensor can be constructed by integrally forming the light-emitting element and the photo acceptance element. Also in the reflection-type APS sensor, the driver of the APS sensor uses the light-emission controller 42 and can control the light quantity of light for document detection which is projected onto the detection position by the light-emitting element, and uses the detection processor 43 and can process the electric signal obtained by converting the light received by the photo acceptance (photoelectric conversion) element. The reflection-type APS sensor is easily installed in the apparatus, and the degree of freedom of installation position is high. The reflection-type APS sensor may be mounted in, for example, the first carriage 19, may be installed at a fixed position below the first carriage, or may be installed on the back side of the platen cover 15.

Figure 7:
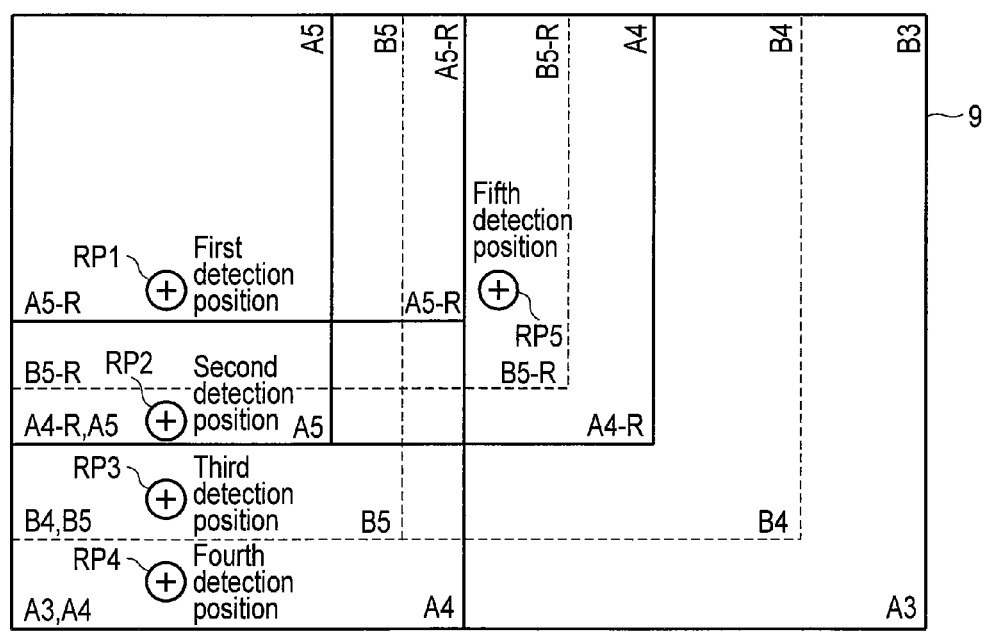
FIG. 7 is a view showing a relation between a document detection position and a document size in the multi function peripherals.

FIG. 7 is a view showing a relation between a detection position of a document and a document size. In the example shown in FIG. 7, sizes of documents as detection objects are assumed to be A-series and B-series sizes. Besides, in the example shown in FIG. 7, first to fifth detection positions mean photo acceptance positions where the photo acceptance elements 20 receive light from the light emitting elements 17.

For example, when the light emitting elements are in the first arrangement example shown in FIG. 4, a first detection position RP1 indicates a photo acceptance position where the photo acceptance element 20A receives the light emitted by the light emitting element 17A. Besides, when the light emitting elements are in the second arrangement example shown in FIG. 6, the first detection position indicates a photo acceptance position where the photo acceptance element 20A receives the light emitted by the light emitting element 17A'. When the light emitting elements are in the first arrangement example shown in FIG. 4, a second, a third, a fourth and a fifth detection position RP2, RP3, RP4 and RP5 respectively indicate photo acceptance positions where the photo acceptance elements 20B, 20C, 20D and 20A receive the lights emitted by the light emitting elements 17B, 17C, 17D and 17E. When the light emitting elements are in the second arrangement example shown in FIG. 6, the second, the third, the fourth and the fifth detection position RP2, RP3, RP4 and RP5 respectively indicate photo acceptance positions where the photo acceptance elements 20B, 20C, 20D and 20A receive the lights emitted by the light emitting elements 17B', 17C', 17D' and 17E'.

The first to the fifth detection positions and the sizes of documents placed on the document table glass 9 have relations as shown in FIG. 7. Based on the relation, the processor 25 detects the size of the document on the document table glass 9, which is placed while the reference position O is made the reference, from the detection results of the presence or absence of a document by the APS sensors at the respective first to fifth detection positions. That is, the processor 25 functions also as a size detection part to detect the size of a document placed on the document table glass 9 by using the detection results of the APS sensors.

Next, a document detecting process by the APS sensor will be described.

Incidentally, in the following description, the APS sensor is not limited to the transmission-type sensor as shown in FIG. 2 to FIG. 5, and may be a reflection-type sensor.

First, a first document detecting process will be described.

Figure 8A:
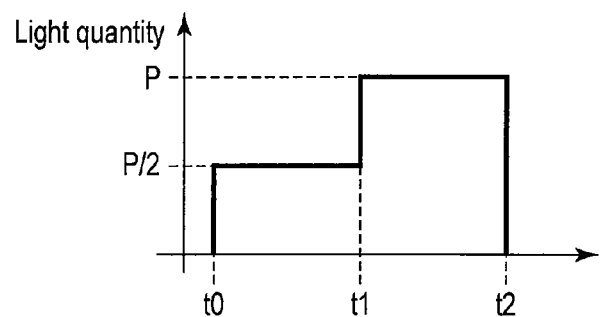
FIG. 8A is a view showing the light quantity of projected light in a first document detecting process.
Figure 8B:
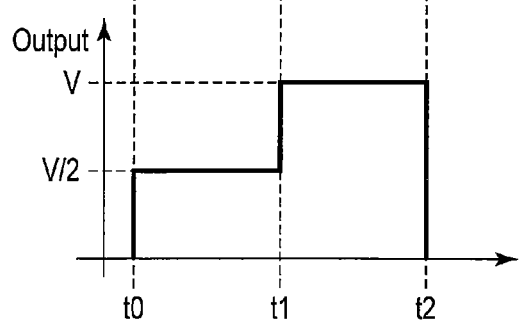
FIG. 8B is a view showing an output value of a photo acceptance element receiving the light having the light quantity shown in FIG. 8A.

FIG. 8A and FIG. 8B are views for explaining the first document detecting process. FIG. 8A is a view showing the light quantity of projected light projected onto a detection position. FIG. 8B is a view showing an output value of a photo acceptance element receiving the light having the light quantity shown in FIG. 8A. In the first document detecting process, the light-emission controller 42 stepwise increases the light quantity of the projected light (light emitted by the light-emitting element of the APS sensor) projected onto the detection position of the document.

In the example shown in FIG. 8A, the light-emission controller 42 controls the light quantity of the projected light projected onto the detection position to P/2 during a period from the start of light emission (time t0) to time t1. When the time becomes t1, the light-emission controller 42 changes the light quantity of the projected light from P/2 to P. The light-emission controller 42 controls the light quantity of the projected light to P during a period from time t1 to the end of light emission (time t2).

The photo acceptance element of the APS sensor receiving the stepwise increasing light quantity as shown in FIG. 8A outputs an output value stepwise increasing according to the change of the stepwise increasing light quantity as shown in FIG. 8B. That is, in the example shown in FIG. 8B, the output value of the photo acceptance element is V/2 during the period from t0 to t1 in which the light quantity of the projected light projected onto the detection position of the document is P/2. Besides, in the example shown in FIG. 8B, the output value of the photo acceptance element is V during the period from t1 to t2 in which the light quantity of the projected light projected onto the detection position of the document is P.

In the transmission-type APS sensor as shown in FIG. 2 to FIG. 5, when the document does not exist at the detection position, the photo acceptance element 20 directly receives the projected light projected by the light emitting element 17. Accordingly, when the document does not exist at the detection position, the transmission-type. APS sensor outputs the stepwise increasing output value according to the stepwise increasing light quantity of the projected light. Besides, when the document exists at the detection position, the reflection-type APS sensor receives the projected light reflected by the document surface. Accordingly, when the document exists at the detection position, the reflection-type APS sensor outputs the stepwise increasing output value according to the stepwise increasing light quantity.

Stray light other than the projected light for detecting the presence or absence of a document is light of a room lamp, external light or the like, and is light incident from the surrounding environment. It is conceivable that the stray light as stated above is incident on the photo acceptance element of the APS sensor at constant light quantity, or is incident on the photo acceptance element of the APS sensor at random timing. Thus, it is conceivable that the light quantity of the stray light is not stepwise changed as shown in FIG. 8A. Accordingly, the detection processor 43 can remove the stray light by detecting the change corresponding to the stepwise change of the light quantity in the output value outputted by the photo acceptance element of the APS sensor.

That is, in the first document detecting process, the detection processor 43 is constructed to output the signal indicating the document detection result (presence or absence of the document) by detecting the change of the output value corresponding to the change of the stepwise increasing light quantity. For example, the detection processor 43 to realize the first document detecting process can be realized by a structural example as described below.

As the structural example to realize the first document detecting process, the detection processor 43 is constructed to detect whether a different between the output value during the period from t0 to t1 and the output value during the period from t1 to t2 is a specified threshold or more. The detection processor 43 in the structural example as stated above can be realized by the processing circuit 43b which outputs the difference value between the output value during the period from t0 to t1 and the output value during the period from t1 to t2, and outputs, as the signal indicating the presence or absence of the document, the signal indicating whether the difference value is the specified threshold or more. Incidentally, in the first document detecting process, the amplifier 43a may be omitted, or a specific amplification factor may be set.

When the APS sensor is the transmission-type sensor, the detection processor 43 having the structure as stated above outputs the signal indicating that the document does not exist at the detection position of the APS sensor when the difference value is the specified threshold or more. When the APS sensor is the reflection-type sensor, the detection processor 43 outputs the signal indicating that the document exists at the detection position of the APS sensor when the difference value is the specified threshold or more.

Besides, as another structural example to realize the first document detecting process, the detection processor 43 compares the output value during the period from t0 to t1 with a first threshold, and compares the output value during the period from t1 to t2 with a second threshold. The detection processor 43 in the structural example as stated above can be realized by the processing circuit 43 to output, as the signal indicating the presence or absence of the document, the signal indicating whether the output value during the period from t0 to t1 is the first threshold or more, and the output value during the period from t1 to t2 is the second threshold or more.

When the APS sensor is the transmission-type sensor, the detection processor 43 having the structure as stated above outputs the signal indicating that the document does not exist at the detection position of the APS sensor when the output value during the period from t0 to t1 is the first threshold or more and the output value during the period from t1 to t2 is the second threshold or more. When the APS sensor is the reflection-type sensor, the detection processor 43 outputs the signal indicating that the document exists at the detection position of the APS sensor when the output value during the period from t0 to t1 is the first threshold or more and the output value during the period from t1 to t2 is the second threshold or more.

Next, a second document detecting process will be described.

Figure 9A:
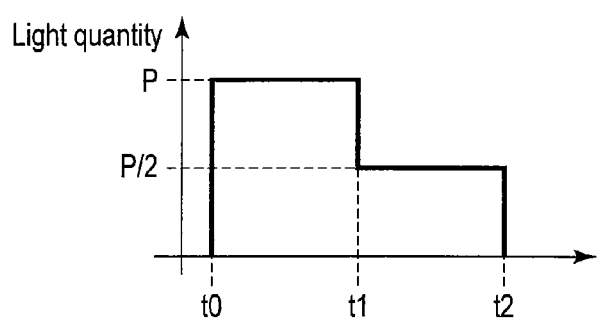
FIG. 9A is a view showing the light quantity of projected light in a second document detecting process.
Figure 9B:
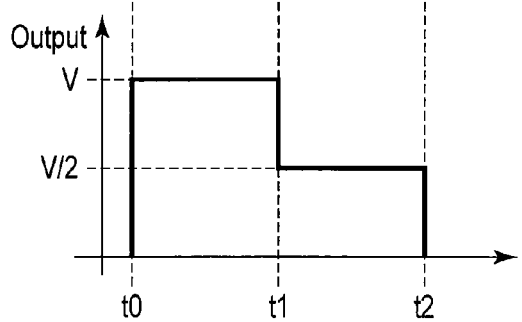
FIG. 9B is a view showing an output value of a photo acceptance element receiving the light having the light quantity shown in FIG. 9A.

FIG. 9A and FIG. 9B are views for explaining the second document detecting process. FIG. 9A is a view showing the light quantity of projected light projected onto a detection position in order to detect a document. FIG. 9B is a view showing an output value of a photo acceptance element receiving the light having the light quantity shown in FIG. 9A. In the second document detecting process, the light-emission controller 42 stepwise decreases the light quantity of the projected light (light emitted by the light-emitting element of the APS sensor) projected onto the detection position of the document.

In the example shown in FIG. 9A, the light-emission controller 42 controls the light quantity of the projected light projected onto the detection position to P during a period from the start of light emission (time t0) to time t1. When time t1 elapses (at time t1), the light-emission controller 42 changes the light quantity of the projected light from P to P/2. The light-emission controller 42 controls the light quantity of the projected light to P/2 during a period from time t1 to the end of light emission (time t2).

The photo acceptance element receiving the stepwise decreasing light quantity outputs an output value stepwise decreasing according to the change of the light quantity. When the stepwise decreasing light quantity is received as shown in FIG. 9A, in the photo acceptance element of the APS sensor, as shown in FIG. 9B, the output value becomes V during the period from t0 to t1 in which the light quantity of the projected light projected onto the detection position is P, and the output value becomes V/2 during the period from t1 to t2 in which the light quantity of the projected light projected onto the detection position is P/2.

In the transmission-type APS sensor as shown in FIG. 2 to FIG. 5, when the document does not exist at the detection position, the photo acceptance element 20 directly receives the projected light projected by the light emitting element 17. Accordingly, when the document does not exist at the detection position, the transmission-type APS sensor outputs the output value stepwise decreasing according to the stepwise decreasing light quantity of the projected light. Besides, when the document exists at the detection position, the reflection-type APS sensor receives the projected light reflected by the document surface. Accordingly, when the document exists at the detection position, the reflection-type APS sensor outputs the output value stepwise decreasing according to the stepwise decreasing light quantity.

As described in the first document detecting process, the light quantity of stray light does not become the stepwise decreasing light quantity as shown in FIG. 9A. Accordingly, the detection processor 43 can remove the stray light by detecting the change corresponding to the stepwise change of the light quantity from the output value obtained by converting the light received by the APS sensor at the detection position. That is, in the second document detecting process, the detection processor 43 outputs the signal indicating the document detection result (presence or absence of the document) by detecting the change of the output value corresponding to the change of the stepwise decreasing light quantity.

The detection processor 43 to the realize the second document detecting process is constructed to output the signal indicating the document detection result (presence or absence of the document) by detecting the change of the output value corresponding to the change of the stepwise decreasing light quantity. For example, the detection processor 43 to realize the second document detecting process can be realized by setting a threshold for detecting the change of the output value corresponding to the change of the stepwise decreasing light quantity in the processing circuit having the same structure as the detection processor to realize the first document detecting process.

According to the first and the second document detecting process, the light quantity of the projected light projected onto the detection position of the document is stepwise changed, and the presence or absence of the document is detected by detecting the change corresponding to the change of the light quantity of the projected light in the output value obtained by converting the light received from the detection position of the document. By this, the output of the stray light other than the projected light for document detection can be removed, and the high accuracy document detection can be realized. Incidentally, in the first and the second document detecting process, since the stepwise change of the output value corresponding to the stepwise change of the light quantity has only to be detected, the processing circuit to process the output of the photo acceptance element can be realized by a simple circuit structure such as a comparator.

Next, a third document detecting process will be described.

Figure 10A:
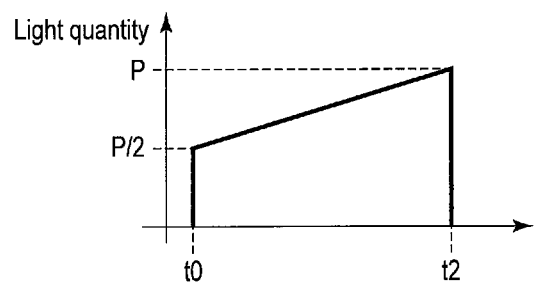
FIG. 10A is a view showing the light quantity of projected light in a third document detecting process.
Figure 10B:
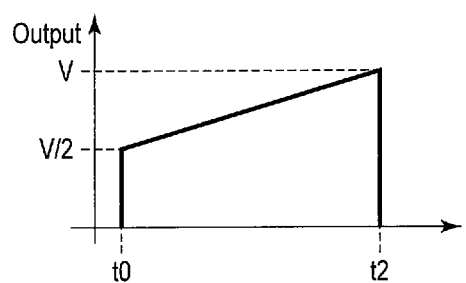
FIG. 10B is a view showing an output value of a photo acceptance element receiving the light having the light quantity shown in FIG. 10A.

FIG. 10A and FIG. 10B are views for explaining the third document detecting process. FIG. 10A is a view showing the light quantity of projected light projected onto a detection position. FIG. 10B is a view showing an output value of a photo acceptance element receiving the light having the light quantity shown in FIG. 10A. As shown in FIG. 10A, in the third document detecting process, the light-emission controller 42 continuously increases the light quantity of the projected light (light emitted by the light-emitting element of the APS sensor) projected onto the detection position of the document at a constant rate.

In the example shown in FIG. 10A, the light-emission controller 42 continuously increases the light quantity of the light projected onto the detection position from P/2 to P at the constant rate (linear function) during a period from the start of light emission (time t0) to time t2. The photo acceptance element of the APS sensor receiving the continuously increasing light quantity outputs the output value continuously increasing according to the change of the light quantity. That is, in the example shown in FIG. 10B, in the photo acceptance element, the output value becomes V/2 at the time t0 when the light quantity of the projected light projected onto the detection position is P/2, and the output value increases from V/2 to V linearly during the period from t0 to t2 in which the light quantity of the projected light projected onto the detection position increases from P/2 to P.

In the transmission-type APS sensor as shown in FIG. 2 to FIG. 5, when the document does not exist at the detection position, the photo acceptance element 20 directly receives the light projected by the light emitting element 17. Accordingly, when the document does not exist at the detection position, the transmission-type APS sensor outputs the output value continuously increasing according to the continuously increasing light quantity. Besides, in the reflection-type APS sensor, when the document exists at the detection position, the photo acceptance element receives the projected light reflected by the document surface. Accordingly, when the document exists at the detection position, the reflection-type APS sensor outputs the output value continuously increasing according to the continuously increasing light quantity.

As described above, the stray light is received at constant light quantity, or the light quantity is changed at random timing. Accordingly, the light quantity of the stray light does not become the continuously increasing change as shown in FIG. 10A. Accordingly, the detection processor 43 of the third document detecting process can remove the stray light by detecting the change corresponding to the change of the continuously increasing light quantity in the output value from the photo acceptance element of the APS sensor.

That is, in the third document detecting process, the detection processor 43 is constructed to output the signal indicating the document detection result (presence or absence of the document) by detecting the change of the output value corresponding to the change of the continuously increasing light quantity. For example, the detection processor 43 to realize the third document detecting process can be realized by a structural example as described below.

As the structural example to realize the third document detecting process, the detection processor 43 samples the output value at plural timings from t0 to t1, and detects whether difference values between the plural sampled output values are not less than a threshold which is set according to the temporal change of the light quantity. The detection processor 43 can be realized by the processing circuit 43b which calculates the difference values between the plural output values sampled at plural timings counted by the timer 43c and outputs, as the signal indicating the presence or absence of the document, the signal indicating whether the difference values are not less than the threshold corresponding to the temporal change of the light quantity.

When the APS sensor is the transmission-type sensor, the detection processor 43 having the structure as stated above outputs the signal indicating that the document does not exist at the detection position of the APS sensor when the difference values are not less than the threshold corresponding to the temporal change of the light quantity. Besides, when the APS sensor is the reflection-type sensor, the detection processor 43 outputs the signal indicating that the document exists at the detection position of the APS sensor when the difference values are not less than the threshold corresponding to the temporal change of the light quantity. Incidentally, in the third document detecting process, the amplifier 43a in the detection processor 43 may be omitted, or a specific amplification factor may be set.

As another structural example to realize the third document detecting process, the detection processor 43 samples plural output values at plural timings from t0 to t2, and detects whether the respective sampled output values are not less than thresholds which are set according to the respective sampling timings. The detection processor 43 can be realized by the processing circuit 43b to output, as the signal indicating the presence or absence of the document, the signal indicating whether none of the sampled output values are less than the thresholds which are set according to the respective sampling timings.

When the APS sensor is the transmission-type sensor, the detection processor 43 having the structure as stated above outputs the signal indicating that the document does not exist at the detection position of the APS sensor when none of the output values are less than the thresholds at the respective sampling timings. Besides, when the APS sensor is the reflection-type sensor, the detection processor 43 outputs the signal indicating that the document exists at the detection position of the APS sensor when none of the output values are less than the thresholds at the respective sampling timings.

Next, a fourth document detecting process will be described.

Figure 11A:
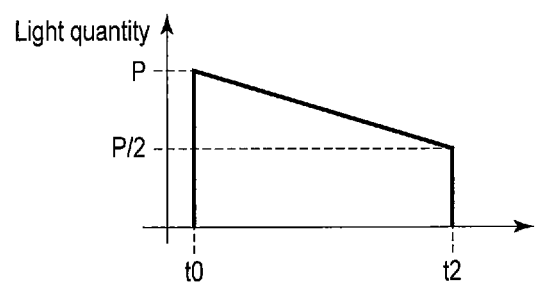
FIG. 11A is a view showing the light quantity of projected light in a fourth document detecting process.
Figure 11B:
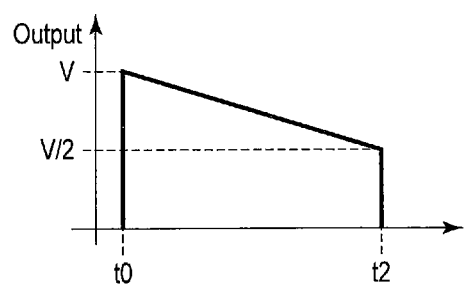
FIG. 11B is a view showing an output value of a photo acceptance element receiving the light having the light quantity shown in FIG. 11A.

FIG. 11A and FIG. 11B are views for explaining the fourth document detecting process. FIG. 11A is a view showing the light quantity of projected light projected onto a detection position. FIG. 11B is a view showing an output value of a photo acceptance element receiving the light having the light quantity shown in FIG. 11A. As shown in FIG. 11A, in the fourth document detecting process, the light-emission controller 42 continuously decreases (changes) the light quantity of the projected light projected onto the detection position of the document at a constant rate. The photo acceptance element receiving the continuously decreasing light quantity as shown in FIG. 11A outputs the output value continuously decreasing according to the change of the continuously decreasing light quantity as shown in FIG. 11B.

In the example shown in FIG. 11A, the light-emission controller 42 continuously changes the light quantity of the projected light projected onto the detection position from P to P/2 at a constant rate (linear function) during a period from the start of light emission (time t0) to time t2. In the example shown in FIG. 11B, the output value of the photo acceptance element (photo acceptance element 20) of the APS sensor becomes V at the time t0 when the light quantity of the light projected onto the detection position is P. Besides, in the example shown in FIG. 11B, the output value of the photo acceptance element of the APS sensor changes from V to V/2 linearly during the period from t0 to t2 according to the decrease of the light quantity of the projected light.

Accordingly, when the document does not exist at the detection position, the transmission-type APS sensor outputs the output value continuously decreasing according to the continuously decreasing light quantity of the projected light. Besides, when the document exists at the detection position, the reflection-type APS sensor outputs the output value continuously decreasing according to the continuously decreasing light quantity.

As described above, the stray light is received at constant light quantity or the light quantity is changed at random timing. Accordingly, the light quantity of the stray light does not become the change of the continuously decreasing light quantity as shown in FIG. 11A. Accordingly, the detection processor 43 of the fourth document detecting process can remove the stray light by detecting the change corresponding to the change of the continuously decreasing light quantity in the output value from the photo acceptance element of the APS sensor.

In the fourth document detecting process, the detection processor 43 is constructed to output the signal indicating the document detection result (presence or absence of the document) by detecting the change of the output value corresponding to the change of the continuously decreasing light quantity. The detection processor 43 to realize the fourth document detecting process can be realized by setting thresholds for detecting the change of the output value corresponding to the change of the continuously decreasing light quantity in the detection processor having the same structure as that of the third document detecting process.

As described above, in the third and the fourth document detecting process, the light-emission controller continuously changes the light quantity of the projected light for document detection which is projected onto the detection position of the document by the light-emitting element of the APS sensor. The detection processor outputs the signal indicating the presence or absence of the document by detecting the change corresponding to the change of the light quantity of the projected light in the output value obtained by converting the light received from the detection position of the document and outputted by the photo acceptance element (photoelectric conversion) of the APS sensor. According to the third and the fourth document detecting process, the high accuracy document detection can be realized in which the output of the stray light other than the projected light for document detection is removed.

Figure 12A:
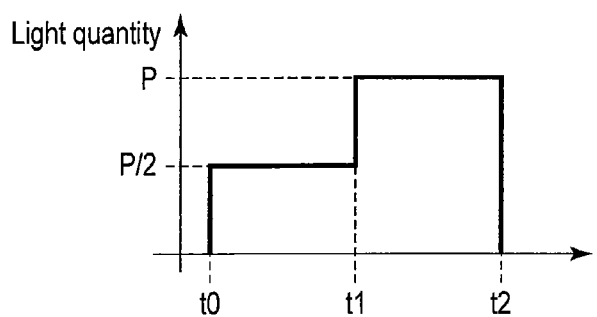
FIG. 12A is a view showing the light quantity of projected light in a fifth document detecting process.
Figure 12B:
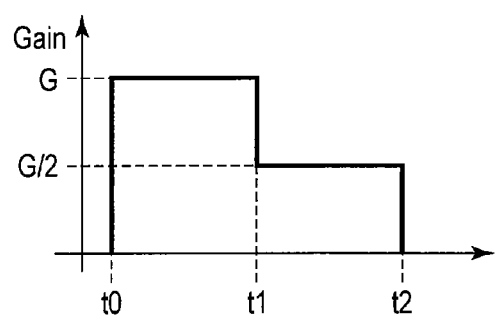
FIG. 12B is a view showing a gain of an amplifier in the fifth document detecting process.
Figure 12C:
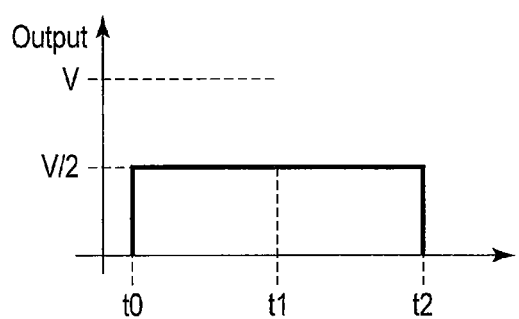
FIG. 12C is a view showing an output value obtained by amplifying an output of a photo acceptance element receiving the light having the light quantity shown in FIG. 12A by the amplifier having the gain shown in FIG. 12B.

Next, a fifth document detecting process will be described. FIG. 12A, FIG. 12B and FIG. 12C are views for explaining the fifth document detecting process. FIG. 12A is a view showing the light quantity of projected light projected onto a detection position. FIG. 12B is a view showing a gain of an amplifier to amplify an output from a photo acceptance element receiving the light having the light quantity shown in FIG. 12A. FIG. 12C is a view showing an output value obtained by amplifying the output of the photo acceptance element receiving the light having the light quantity shown in FIG. 12A by the amplifier having the gain shown in FIG. 12B. That is, the output of the photo acceptance element receiving the light having the light quantity shown in FIG. 12A is amplified by the amplifier having the gain shown in FIG. 12B and becomes the output having a constant value as shown in FIG. 12C.

In the fifth document detecting process, as shown in FIG. 12A and FIG. 12B, the light quantity of the projected light onto the detection position is stepwise increased, and the amplification factor for the output signal is decreased according to the stepwise increase of the light quantity. The gain shown in FIG. 12B is the amplification factor to cancel the increase of the output value increasing according to the increase of the light quantity shown in FIG. 12A.

In the example shown in FIG. 12A, the light-emission controller 42 controls the light quantity of the light projected onto the detection position to P/2 during a period from time t0 to time t1. When the time becomes t1, the light-emission controller 42 changes the light quantity of the projected light from P/2 to P. The light-emission controller 42 controls the light quantity of the projected light to P during a period from time t1 to time t2 of the end of light emission. The amplifier 43a sets the gain to G during the period from t0 to t1 in which the light quantity of the projected light is set to P/2. The amplifier 43a changes the gain from G to G/2 when the light quantity of the projected light is changed from P/2 to P (at time t1). The amplifier 43a sets the gain to G/2 during the period from time t1 to time t2 in which the light quantity of the projected light is set to P.

The light-emission controller 42 stepwise increases the light quantity of the projected light projected onto the detection position of the document. The amplifier 43a of the detection processor 43 changes the gain according to the change of the light quantity of the projected light controlled by the light-emission controller 42. The amplifier 43a may be such that the gain is changed at the same timing as the change of the light quantity controlled by the light-emission controller 42. For example, the processor 25 may control the light quantity of the projected light emitted from the light-emitting element by the light-emission controller 42 and the gain of the amplifier 43a. In this case, the processor 25 performs the control to increase the light quantity of the projected light and the control to decrease the amplification factor for the output signal at the same timing. Incidentally, the light-emission controller 42 may control the gain of the amplifier 43a at the same timing as the change of the light quantity.

In the example shown in FIG. 12C, since the gain of the amplifier 43a is G during the period from t0 to t1 in which the light quantity of the projected light projected onto the detection position of the document is P/2, the output value obtained by amplifying the output of the photo acceptance element becomes V/2. Besides, in the example shown in FIG. 12C, since the gain of the amplifier 43a is G/2 during the period from t1 to t2 in which the light quantity of the projected light projected onto the detection position of the document is P, the output value obtained by amplifying the output of the photo acceptance element becomes V/2. That is, in the example shown in FIG. 12C, the output value obtained by amplifying the output of the photo acceptance element receiving the light shown in FIG. 12A always becomes the constant value (V/2) during the period from t0 to t2.

When the gain for amplifying the output of the photo acceptance element is changed, the component of stray light incident on the photo acceptance element at constant light quantity becomes an output value changing according to the change of the gain. Besides, the output value is changed also by the stray light incident on the photo acceptance element at random timing. That is, the component of the stray light does not appear as a constant value in the output value. Accordingly, in the fifth document detecting process, the stray light can be removed by detecting a specified constant value in the output value obtained by amplifying the output of the photo acceptance element. For example, the change of the output value corresponding to the gain can be removed as the component of the stray light.

In the fifth document detecting process, the processing circuit 43*b* of the detection processor 43 is constructed to output the signal indicating the document detection result (presence or absence of the document) by detecting the output value which becomes the constant value by the change of the stepwise increasing light quantity and the stepwise decreasing gain of the amplifier 43*a*. For example, the detection processor 43 to realize the fifth document detecting process can be realized by the following structural example.

As the structural example to realize the fifth document detecting process, the detection processor 43 is constructed to detect whether a difference between an output value after amplification by the amplifier 43*a* during the period from t0 to t1 and an output value after amplification by the amplifier 43*a* during the period from t1 to t2 is a specified threshold or less. The detection processor 43 having the structure as stated above can be realized by the processing circuit 43*b* which outputs the difference value between the output value of the amplifier 43*a* during the period from t0 to t1 and the output value of the amplifier 43*a* during the period from t1 to t2, and outputs, as the signal indicating the presence or absence of the document, the signal indicating whether the difference value is the specified threshold or less.

When the APS sensor is the transmission-type sensor, the detection processor 43 having the structure as stated above outputs the signal indicating that the document does not exist at the detection position of the APS sensor when the difference value is the specified threshold or less (when the output value after amplification is constant within the range of the threshold). When the APS sensor is the reflection-type sensor, the detection processor 43 outputs the signal indicating that the document exists at the detection position of the APS sensor when the difference value is less than the specified threshold (when the output value after amplification is constant within the range of the threshold).

Besides, as another structural example to realize the fifth document detecting process, the detection processor 43 compares the output value during the period from t0 to t1 with a threshold, and compares the output value during the period from t1 to t2 with the threshold. The detection processor 43 having the structure as stated above can be realized by the detection processor 43 to output, as the signal indicating the presence or absence of the document, the signal indicating whether the output value during the period from t0 to t1 is the threshold or more and whether the output value during the period from t1 to t2 is also the threshold or more.

When the APS sensor is the transmission-type sensor, the detection processor 43 having another structure as stated above outputs the signal indicating that the document does not exist at the detection position of the APS sensor when the output value during the period from t0 to t1 is the threshold or more and the output value during the period from t1 to t2 is the threshold or more. When the APS sensor is the reflection-type sensor, the detection processor 43 outputs the signal indicating that the document exists at the detection position of the APS sensor when the output value during the period from t0 to t1 is the threshold or more and the output value during the period from t1 to t2 is also the threshold or more.

Next, a sixth document detecting process will be described.

Figure 13A:
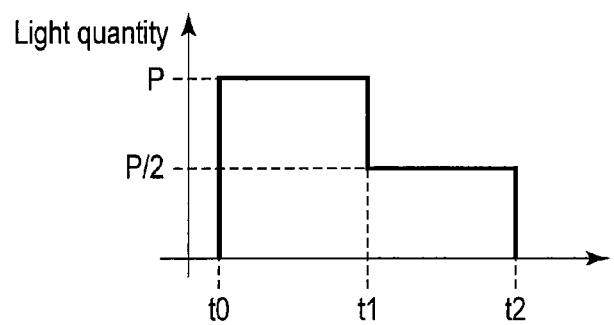
FIG. 13A is a view showing the light quantity of projected light in a sixth document detecting process.
Figure 13B:
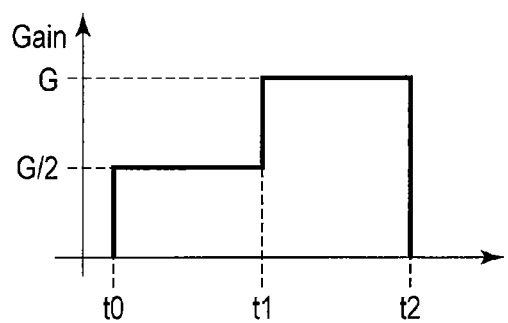
FIG. 13B is a view showing a gain of an amplifier in the sixth document detecting process.
Figure 13C:
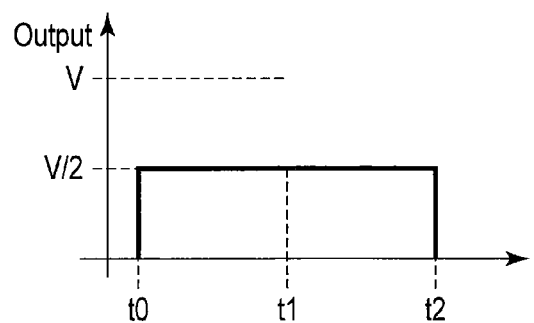
FIG. 13C is a view showing an output value obtained by amplifying an output of a photo acceptance element receiving the light having the light quantity shown in FIG. 13A by the amplifier having the gain shown in FIG. 13B.

FIG. 13A, FIG. 13B and FIG. 13C are views for explaining the sixth document detecting process. FIG. 13A is a view showing the light quantity of projected light projected onto a detection position. FIG. 13B is a view showing a gain of an amplifier to amplify an output from a photo acceptance element receiving the light having the light quantity shown in FIG. 13A. FIG. 13C is a view showing an output value obtained by amplifying the output of the photo acceptance element receiving the light having the light quantity shown in FIG. 13A by the amplifier having the gain shown in FIG. 13B. That is, the output of the photo acceptance element receiving the light having the light quantity shown in FIG. 13A is amplified by the amplifier having the gain shown in FIG. 13B and becomes a constant value as shown in FIG. 13C.

In the sixth document detecting process, as shown in FIG. 13A and FIG. 13B, the light quantity of the projected light projected onto the detection position is stepwise decreased, and the amplification factor for the output signal is increased according to the stepwise decrease of the light quantity. The gain shown in FIG. 13B is the amplification factor to cancel the decrease of the output value decreasing according to the decrease of the light quantity shown in FIG. 13A.

In the example shown in FIG. 13A, the light-emission controller 42 controls the light quantity of the light projected onto the detection position to P during a period from time t0 of the start of light emission to time t1. When the time becomes t1, the light-emission controller 42 changes the light quantity of the projected light from P to P/2. The light-emission controller 42 controls the light quantity of the projected light to P/2 during a period from time t1 to time t2 of the end of light emission. On the other hand, the amplifier 43*a* sets the gain to G/2 during the period from time t0 to time t1 in which the light quantity of the projected light is set to P. The amplifier 43*a* changes the gain from G/2 to G when the light quantity of the projected light is changed from P to P/2 (at time t1). The amplifier 43*a* has the gain of G during the period from time t1 to time t2 in which the light quantity of the projected light is set to P/2.

The light-emission controller 42 stepwise decreases the light quantity of the projected light projected onto the detection position of the document. The amplifier 43*a* of the detection processor 43 increases the gain according to the decrease of the light quantity of the projected light controlled by the light-emission controller 42. The amplifier 43*a* may be such that the gain is changed at the same timing as the change of the light quantity controlled by the light-emission controller 42. For example, the processor 25 may control the light quantity of the projected light emitted from the light-emitting element by the light-emission controller 42 and the gain of the amplifier 43*a*. In this case, the processor 25 performs the control to decrease the light quantity of the projected light and the control to increase the amplification factor for the output signal at the same timing. Incidentally, the light-emission controller 42 may control the gain of the amplifier 43*a* at the same timing as the change of the light quantity.

In the example shown in FIG. 13C, since the gain of the amplifier 43*a* is G/2 during the period from t0 to t1 in which the light quantity of the projected light projected onto the detection position of the document is P, the output value obtained by amplifying the output of the photo acceptance element becomes V/2. Besides, in the example shown in FIG. 13C, since the gain of the amplifier 43*a* is G during the period from t1 to t2 in which the light quantity of the projected light projected onto the detection position of the document is P/2, the output value obtained by amplifying the output of the photo acceptance element becomes V/2. That is, in the example shown in FIG. 13C, the output value obtained by amplifying the output of the photo acceptance element receiving the light having the light quantity shown in FIG. 13A always becomes the constant value (V/2) during the period from t0 to t2.

When the gain for amplifying the output of the photo acceptance element is changed, the component of the stray light incident on the photo acceptance element at constant light quantity becomes an output value changing according to the change of the gain. Besides, the output value is changed also by the stray light incident on the photo acceptance element at random timing. That is, the component of the stray light does not appear as a constant value in the output value. Accordingly, in the sixth document detecting process, the stray light can be removed by detecting a specified constant value in the output value obtained by amplifying the output of the photo acceptance element. For example, the change of the output value corresponding to the gain can be removed as the component of the stray light.

In the sixth document detecting process, the detection processor 43 is constructed to output the signal indicating the document detection result (presence or absence of the document) by detecting the change of the output value corresponding to the change of the stepwise decreasing light quantity. For example, the detection processor 43 to realize the sixth document detecting process can be realized by setting a threshold for detecting the change of the output value corresponding to the change of the stepwise decreasing light quantity in the detection processor having the same structure as that of the fifth document detecting process.

As described above, according to the fifth and the sixth document detecting process, the light-emission controller stepwise changes the light quantity of the projected light for document detection which is projected onto the detection position of the document by the light-emitting element of the APS sensor. The detection processor stepwise changes the gain of the amplifier so as to cancel the change of the output value corresponding to the change of the light quantity of the projected light, and outputs the signal indicating the presence or absence of the document by detecting that the output value after the output of the photo acceptance element of the APS sensor is amplified by the amplifier becomes the constant value. According to the fifth and the sixth document detecting process, the high accuracy document detection can be realized in which the output of the stray light other than the projected light for document detection is removed.

Next, a seventh document detecting process will be described.

Figure 14A:
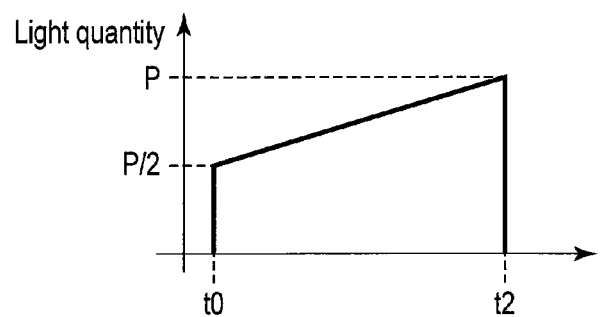
FIG. 14A is a view showing the light quantity of projected light in a seventh document detecting process.
Figure 14B:
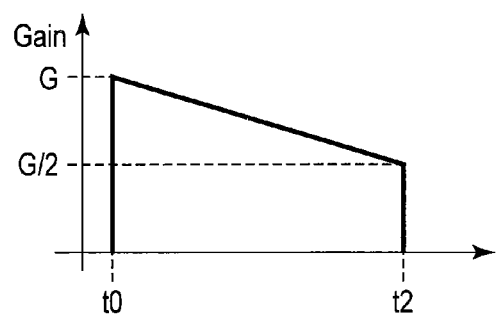
FIG. 14B is a view showing a gain of an amplifier in the seventh document detecting process.
Figure 14C:
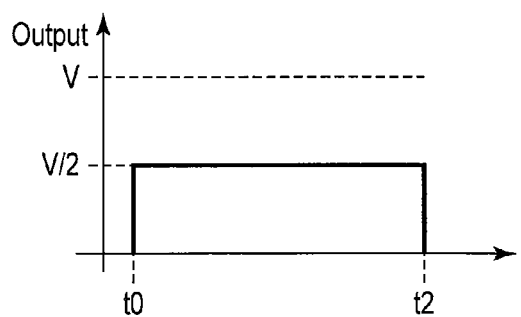
FIG. 14C is a view showing an output value obtained by amplifying an output of a photo acceptance element receiving the light having the light quantity shown in FIG. 14A by the amplifier having the gain shown in FIG. 14B.

FIG. 14A, FIG. 14B and FIG. 14C are views for explaining the seventh document detecting process. FIG. 14A is a view showing the light quantity of light projected onto a detection position. FIG. 14B is a view showing a gain of an amplifier to amplify an output from a photo acceptance element receiving the light having the light quantity shown in FIG. 14A. FIG. 14C is a view showing an output value obtained by amplifying the output of the photo acceptance element receiving the light having the light quantity shown in FIG. 14A by the amplifier having the gain shown in FIG. 14B. That is, the output of the photo acceptance element receiving the light having the light quantity shown in FIG. 14A is amplified by the amplifier having the gain shown in FIG. 14B and becomes the output of the constant value as shown in FIG. 14C.

In the seventh document detecting process, as shown in FIG. 14A and FIG. 14B, the light quantity of the projected light onto the detection position is continuously increased at a constant rate, and the amplification factor for the output signal is decreased according to the continuous increase of the light quantity. The gain shown in FIG. 14B is the amplification factor changing so as to cancel the increase of the output value increasing according to the increase of the light quantity shown in FIG. 14A.

In the example shown in FIG. 14A, the light-emission controller 42 continuously (linear function) changes the light quantity of the light projected onto the detection position from P/2 to P at a constant rate during a period from time t0 of the start of light emission to time t1. Correspondingly to the change of the light quantity caused by the light-emission controller 42, the amplifier 43a changes the gain from G to G/2 during the period from time t0 to time t2 as shown in FIG. 14B. In the example shown in FIG. 14C, the gain G changes the output value corresponding to the light having the light quantity P/2 to V/2, and the gain G/2 changes the output value corresponding to the light having the light quantity P to V/2. That is, in the example shown in FIG. 14C, during the period (from t0 to t2) in which the light quantity of the projected light projected onto the detection position of the document is changed from P/2 to P at the constant rate, since the gain of the amplifier 43a is changed from G to G/2 at the constant rate, the output value obtained by amplifying the output of the photo acceptance element always becomes V/2.

The amplifier 43a may be such that the gain is changed in accordance with the change of the light quantity controlled by the light-emission controller 42. For example, the processor 25 may control the light quantity of the projected light emitted from the light-emitting element by the light-emission controller 42 and the gain of the amplifier 43a. In this case, the processor 25 performs the control to increase the light quantity of the projected light at the constant rate and the control to decrease the amplification factor for the output signal at the constant rate in parallel. Incidentally, the light-emission controller 42 may control the gain of the amplifier 43a at the same timing as the change of the light quantity.

When the gain for amplifying the output of the photo acceptance element is changed, the component of the stray light incident on the photo acceptance element at constant light quantity is changed according to the change of the gain. Besides, the output value is changed also by the stray light incident on the photo acceptance element at random timing. That is, the component of the stray light does not appear as a constant value in the output value. Accordingly, in the seventh document detecting process, the stray light can be removed by detecting a specified constant value in the output value obtained by amplifying the output of the photo acceptance element. For example, the change of the output value corresponding to the gain can be removed as the component of the stray light.

In the seventh document detecting process, the processing circuit 43b of the detection processor 43 is constructed to output the signal indicating the document detection result (presence or absence of the document) by detecting the output value which becomes constant by the continuously increasing light quantity and the continuously decreasing gain of the amplifier 43a. For example, the detection processor 43 to realize the seventh document detecting process can be realized by the following structural example.

As the structural example to realize the seventh document detecting process, the detection processor 43 samples output values after amplification by the amplifier 43a at plural timings during the period from t0 to t2, and detects whether difference values between the respective sampled output values are a specified threshold or less. The detection processor 43 having the structural example as stated above can be realized by the processing circuit 43b which outputs the difference values between the plural output values of the amplifier 43a sampled at the plural timings during the period from t0 to t2, and outputs, as the signal indicating the presence or absence of the document, the signal indicating whether the difference values are the specified threshold or less.

The difference value is the value indicating the change of the output value between timings when two output values are sampled. For example, when the difference value is 0, the change of the output value is 0. That is, that the difference value is the specified threshold or less indicates that the change amount of the output value is within the specified range (threshold or less). Accordingly, in order to facilitate the detection of the change of the output value corresponding to the change of the gain during the period from t0 to t2, two output values from which the difference value is calculated are sampled at a long interval.

When the APS sensor is the transmission-type sensor, the detection processor 43 having the structure as stated above outputs the signal indicating that the document does not exist at the detection position of the APS sensor when the difference value is the specified threshold or less (when the change of the output value after amplification is within the range of the threshold). When the APS sensor is the reflection-type sensor, the detection processor 43 outputs the signal indicating that the document exists at the detection position of the APS sensor when the difference value is less than the specified threshold (when the change of the output value after amplification is within the range of the threshold).

As another structural example to realize the seventh document detecting process, the detection processor 43 may be constructed to sample the output value of the amplifier 43a at plural timings during the period from t0 to t2, and to compare the respective sampled output values with one threshold. The detection processor 43 having the structure as stated above can be realized by the processing circuit 43 which outputs, as the signal indicating the presence or absence of the document, the signal indicating whether all the plural output values sampled at the plural timings during the period from t0 to t2 are the threshold or more.

When the APS sensor is the transmission-type sensor, the detection processor 43 having another structural example as stated above outputs the signal indicating that the document does not exist at the detection position of the APS sensor when all the plural output values during the period from t0 to t2 are the specified threshold or more. When the APS sensor is the reflection-type sensor, the detection processor 43 outputs the signal indicating that the document exists at the detection position of the APS sensor when the plural output values during the period from t0 to t2 are the threshold or more.

Next, an eighth document detecting process will be described.

Figure 15A:
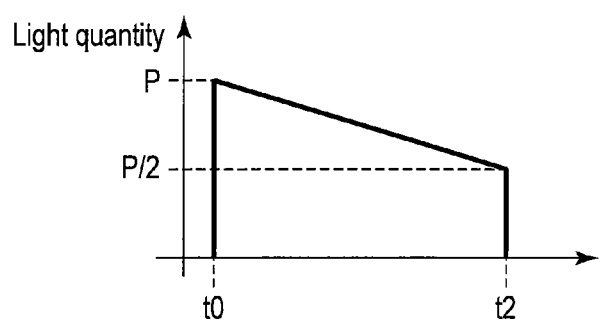
FIG. 15A is a view showing the light quantity of projected light in an eighth document detecting process.
Figure 15B:
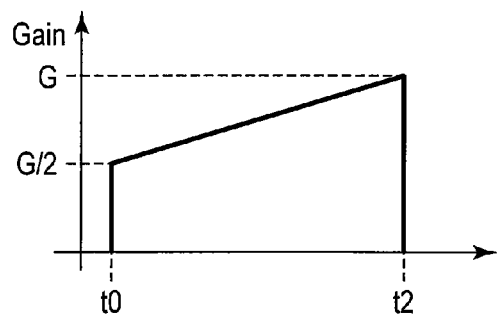
FIG. 15B is a view showing a gain of an amplifier in the eighth document detecting process.
Figure 15C:
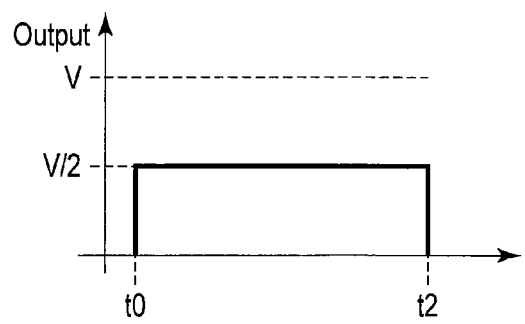
FIG. 15C is a view showing an output value obtained by amplifying an output of a photo acceptance element receiving the light having the light quantity shown in FIG. 15A by the amplifier having the gain shown in FIG. 15B.

FIG. 15A, FIG. 15B and FIG. 15C are views for explaining the eighth document detecting process. FIG. 15A is a view showing the light quantity of light projected onto a detection position. FIG. 15B is a view showing a gain of an amplifier to amplify an output from a photo acceptance element receiving the light having the light quantity shown in FIG. 15A. FIG. 15C is a view showing an output value obtained by amplifying the output of the photo acceptance element receiving the light having the light quantity shown in FIG. 15A by the amplifier having the gain shown in FIG. 15B. That is, the output of the photo acceptance element receiving the light having the light quantity shown in FIG. 15A is amplified by the amplifier having the gain shown in FIG. 15B and becomes the output of the constant value as shown in FIG. 15C.

In the eighth document detecting process, as shown in FIG. 15A and FIG. 15B, the light quantity of the projected light onto the detection position is continuously decreased at a constant rate, and the amplification factor for the output signal is increased according to the continuous decrease of the light quantity. The gain shown in FIG. 15B is the amplification factor increasing so that the output value is amplified so as to cancel the decrease of the output value decreasing according to the decrease of the light quantity shown in FIG. 15A.

In the example shown in FIG. 15A, the light-emission controller 42 continuously (linear function) changes the light quantity of the light projected onto the detection position from P to P/2 at a constant rate during a period from time t0 of the start of light emission to time t1. The amplifier 43a changes the gain from G/2 to G during the period from time t0 to time t2 as shown in FIG. 15B correspondingly to the change of the light quantity caused by the light-emission controller 42. In the example shown in FIG. 15C, the gain G/2 changes the output value for the light of the light quantity P to V/2, and the gain G changes the output value for the light of the light quantity P/2 to V/2. That is, in the example shown in FIG. 15C, during the period (from t0 to t2) in which the light quantity of the projected light projected onto the detection position of the document is changed from P to P/2 at the constant rate, since the gain of the amplifier 43a is changed from G/2 to G at the constant rate, the output value obtained by amplifying the output of the photo acceptance element always becomes V/2.

The amplifier 43a may be such that the gain is changed in accordance with the change of the light quantity controlled by the light-emission controller 42. For example, the processor 25 may control the light quantity of the projected light emitted from the light-emitting element by the light-emission controller 42 and the gain of the amplifier 43a. In this case, the processor 25 performs the control to decrease the light quantity of the projected light at the constant rate and the control to increase the amplification factor for the output signal at the constant rate in parallel. Incidentally, the light-emission controller 42 may control the gain of the amplifier 43a at the same timing as the change of the light quantity.

As described above, the component of the stray light does not appear as a constant value in the output value. Accordingly, also in the eighth document detecting process, the change of the output value corresponding to the change of the gain can be removed as the component of the stray light. That is, also in the eighth document detecting process, similarly to the seventh document detecting process, the stray light can be removed by detecting a specified constant value in the output value obtained by amplifying the output of the photo acceptance element.

In the eighth document detecting process, the processing circuit 43b of the detection processor 43 is constructed to output the signal indicating the document detection result (presence or absence of the document) by detecting the output value which becomes constant by the continuously decreasing light quantity and the continuously increasing gain of the amplifier 43a. For example, the detection processor 43 to realize the eighth document detecting process can be realized by the same structural example as the detection processor to realize the seventh document detecting process.

As described above, according to the seventh and the eighth document detecting process, the light-emission controller continuously changes the light quantity of the projected light for document detection which is projected onto the detection position of the document by the light-emitting element of the APS sensor. The detection processor continuously changes the gain of the amplifier so as to cancel the change of the output value corresponding to the change of the light quantity of the projected light, and outputs the signal indicating the presence or absence of the document by detecting that the output value after the output of the photo acceptance element of the APS sensor is amplified by the amplifier becomes the constant value. According to the seventh and the eighth document detecting process, the high accuracy document detection can be realized in which the output of the stray light other than the projected light for document detection is removed.

Next, a ninth document detecting process will be described.

Figure 16A:
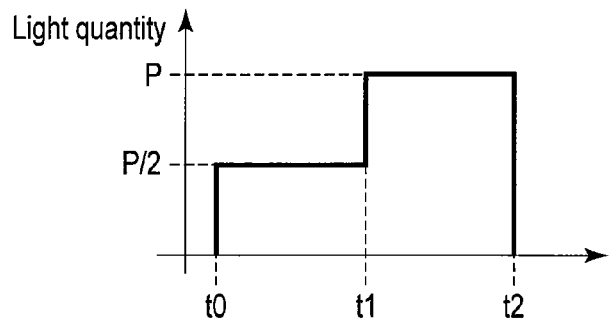
FIG. 16A is a view showing the light quantity of projected light in a ninth document detecting process.
Figure 16B:
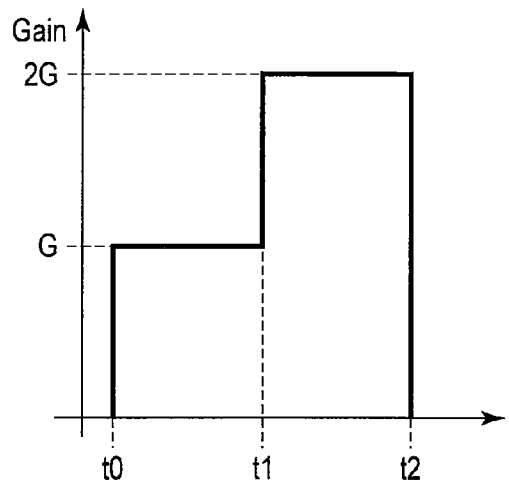
FIG. 16B is a view showing a gain of an amplifier in the ninth document detecting process.
Figure 16C:
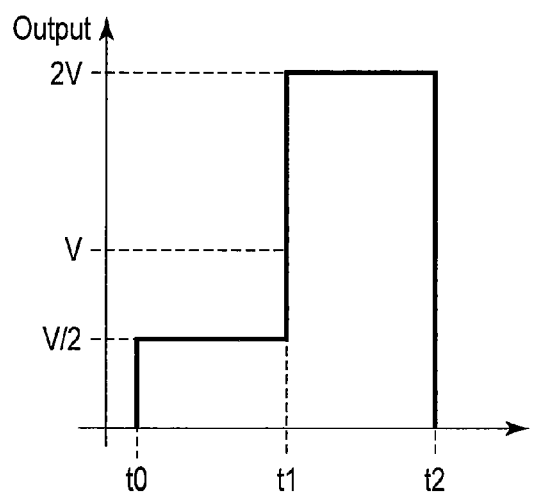
FIG. 16C is a view showing an output value obtained by amplifying an output of a photo acceptance element receiving the light having the light quantity shown in FIG. 16A by the amplifier having the gain shown in FIG. 16B.

FIG. 16A, FIG. 16B and FIG. 16C are views for explaining the ninth document detecting process. FIG. 16A is a view showing the light quantity of projected light projected onto a detection position. FIG. 16B is a view showing a gain of an amplifier to amplify an output from a photo acceptance element receiving the light having the light quantity shown in FIG. 16A. FIG. 16C is a view showing an output value obtained by amplifying the output of the photo acceptance element receiving the light having the light quantity shown in FIG. 16A by the amplifier having the gain shown in FIG. 16B. That is, the output of the photo acceptance element receiving the light having the light quantity shown in FIG. 16A is amplified by the amplifier having the gain shown in FIG. 16B and becomes the output of the output value as shown in FIG. 16C.

In the ninth document detecting process, as shown in FIG. 16A and FIG. 16B, the light quantity of the projected light onto the detection position is stepwise increased, and the amplification factor for the output signal is also increased at the timing when the light quantity is stepwise increased. The gain shown in FIG. 16B is the amplification factor to further increase the increase of the output value increased by the increase of the light quantity shown in FIG. 16A.

In the example shown in FIG. 16A, the light-emission controller 42 sets the light quantity of the light projected onto the detection position to P/2 during a period from time t0 of the start of light emission to time t1, and sets the light quantity of the projected light to P during a period from time t1 to time t2 of the end of light emission. The amplifier 43a sets the gain to G during the period from t0 to t1 in which the light quantity of the projected light is set to P/2, and sets the gain to 2G during the period from t1 to t2 in which the light quantity of the projected light is set to P.

In the example shown in FIG. 16C, since the gain of the amplifier 43a is G during the period from t0 to t1 in which the light quantity of the projected light projected onto the detection position of the document is P/2, the output value obtained by amplifying the output of the photo acceptance element becomes V/2. Besides, in the example shown in FIG. 16C, since the gain of the amplifier 43a is 2G during the period from t1 to t2 in which the light quantity of the projected light projected onto the detection position of the document is P, the output value obtained by amplifying the output of the photo acceptance element becomes 2V. That is, in the example shown in FIG. 16C, the output value obtained by amplifying the output of the photo acceptance element receiving the light shown in FIG. 16A becomes V/2 during the period from t0 to t1, and becomes 2V (four times larger than V/2) during the period from t1 to t2.

The gain of the amplifier 43a of the detection processor 43 changes according to the change of the light quantity of the projected light by the light-emission controller 42. The amplifier 43a may be such that the gain is changed at the same timing as the timing when the light-emission controller 42 changes the light quantity. For example, the processor 25 may control the light quantity of the projected light emitted from the light-emitting element by the light-emission controller 42 and the gain of the amplifier 43a. In this case, the processor 25 performs the control to increase the light quantity of the projected light and the control to increase the amplification factor for the output signal at the same timing. Incidentally, the light-emission controller 42 may control the gain of the amplifier 43a at the same timing as the change of the light quantity.

As described above, the stray light is incident on the photo acceptance element of the APS sensor at constant light quantity or is incident on the photo acceptance element of the APS sensor at random timing. Accordingly, the detection processor 43 of the ninth document detecting process can remove the stray light by detecting the change corresponding to the stepwise increase of the light quantity of the projected light and the stepwise increase of the gain of the amplifier in the output value obtained by amplifying the output of the photo acceptance element of the APS sensor.

The detection processor 43 to realize the ninth document detecting process is constructed to output the signal indicating the document detection result (presence or absence of the document) by detecting the change of the output value stepwise increasing according to the stepwise increasing light quantity and the stepwise increasing gain of the amplifier. Since the detection processor 43 to realize the ninth document detecting process detects the change of the stepwise increasing output value, the detection processor can be realized by the same structure as the detection processor to realize the first document detecting process.

However, in the ninth document detecting process, the light quantity of the projected light is stepwise increased, and further, the output value of the amplifier having the stepwise increasing gain is processed. Accordingly, the processing circuit 43b of the detection processor 43 to realize the ninth document detecting process is required to detect the change of the larger output value than the first document detecting process. Thus, a threshold corresponding to the change of the output value increased stepwise by a large change amount is set in the processing circuit 43b of the detection processor 43 to realize the ninth document detecting process.

Next, a tenth document detecting process will be described.

FIG. 17A, FIG. 17B and FIG. 17C are views for explaining the tenth document detecting process. FIG. 17A is a view showing the light quantity of projected light projected onto a detection position. FIG. 17B is a view showing a gain of an amplifier to amplify an output from a photo acceptance element receiving the light having the light quantity shown in FIG. 17A. FIG. 17C is a view showing an output value obtained by amplifying the output of the photo acceptance element receiving the light having the light quantity shown in FIG. 17A by the amplifier having the gain shown in FIG. 17B. That is, the output of the photo acceptance element receiving the light having the light quantity shown in FIG. 17A is amplified by the amplifier having the gain shown in FIG. 17B and the output value as shown in FIG. 17C is outputted.

In the tenth document detecting process, as shown in FIG. 17A and FIG. 17B, the light quantity of the projected light onto the detection position is stepwise decreased, and the amplification factor for the output signal is also decreased at the timing when the light quantity is stepwise decreased. The gain shown in FIG. 17B is the amplification factor to further decrease the output value decreased by the decrease of the light quantity shown in FIG. 17A. In the example shown in FIG. 17A, the light-emission controller 42 sets the light quantity of the light projected onto the detection position to P during a period from time t0 of the start of light emission to time t1, and sets the light quantity of the projected light to P/2 during a period from time t1 to time t2 of the end of light emission. The amplifier 43a sets the gain to 2G during the period from t0 to t1 in which the light quantity of the projected light is set to P, and sets the gain to G during the period from t1 to t2 in which the light quantity of the projected light is set to P/2.

In the example shown in FIG. 17C, since the gain of the amplifier 43a is 2G during the period from t0 to t1 in which the light quantity of the projected light projected onto the detection position of the document is P, the output value obtained by amplifying the output of the photo acceptance element becomes 2V. Besides, in the example shown in FIG. 17C, since the gain of the amplifier 43a is G during the period from t1 to t2 in which the light quantity of the projected light projected onto the detection position of the document is P/2, the output value obtained by amplifying the output of the photo acceptance element becomes V/2. That is, in the example shown in FIG. 17C, the output value obtained by amplifying the output of the photo acceptance element receiving the light shown in FIG. 17A by the amplifier having the gain shown in FIG. 17B becomes 2V during the period from t0 to t1 and becomes V/2 (one-fourth larger than 2V) during the period from t1 to t2.

Similarly to the detection processor of the ninth document detecting process, the detection processor 43 of the tenth document detecting process can remove the stray light by detecting the change corresponding to the stepwise decrease of the light quantity of the projected light and the stepwise decrease of the gain of the amplifier in the output value obtained by amplifying the output of the photo acceptance element of the APS sensor. The detection processor 43 to realize the tenth document detecting process is constructed to output the signal indicating the document detection result (presence or absence of the document) by detecting the change of the output value stepwise decreasing according to the stepwise decreasing light quantity and the stepwise decreasing gain of the amplifier.

That is, since the detection processor 43 to realize the tenth document detecting process detects the change of the stepwise decreasing output value, the detection processor can be realized by the same structure as the detection processor to realize the second document detecting process. However, in the tenth document detecting process, the light quantity of the projected light is stepwise decreased, and further, the output value of the amplifier having the stepwise decreasing gain is processed. Accordingly, a threshold corresponding to the change of the output value decreased stepwise by a large change amount is set in the processing circuit 43b of the detection processor 43 to realize the tenth document detecting process.

As described above, according to the ninth and the tenth document detecting process, the light-emission controller stepwise changes the light quantity of the projected light for document detection which is projected onto the detection position of the document by the light-emitting element of the APS sensor. The detection processor stepwise changes the gain of the amplifier to further amplify the change of the light quantity of the projected light, and outputs the signal indicating the presence or absence of the document by detecting the change of the amplified output value. According to the ninth and the tenth document detecting process, the high accuracy document detection can be realized in which the output of the stray light other than the projected light for document detection is removed.

Next, an eleventh document detecting process will be described.

Figure 18A:
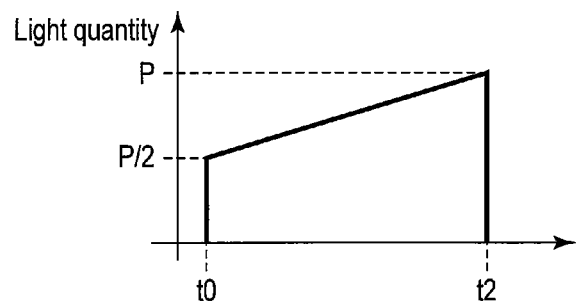
FIG. 18A is a view showing the light quantity of projected light in an eleventh document detecting process.
Figure 18B:
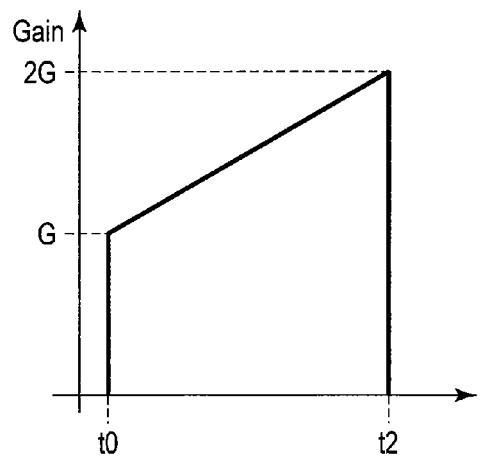
FIG. 18B is a view showing a gain of an amplifier in the eleventh document detecting process.
Figure 18C:
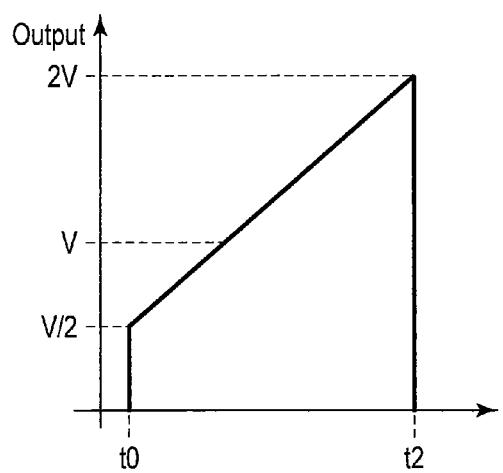
FIG. 18C is a view showing an output value obtained by amplifying an output of a photo acceptance element receiving the light having the light quantity shown in FIG. 18A by the amplifier having the gain shown in FIG. 18B.

FIG. 18A, FIG. 18B and FIG. 18C are views for explaining an eleventh document detecting process. FIG. 18A is a view showing the light quantity of projected light projected onto a detection position. FIG. 18B is a view showing a gain of an amplifier to amplify an output from a photo acceptance element receiving the light having the light quantity shown in FIG. 18A. FIG. 18C is a view showing an output value obtained by amplifying the output of the photo acceptance element receiving the light having the light quantity shown in FIG. 18A by the amplifier having the gain shown in FIG. 18B. That is, the output of the photo acceptance element receiving the light having the light quantity shown in FIG. 18A is amplified by the amplifier having the gain shown in FIG. 18B, and the output value as shown in FIG. 18C is outputted.

In the eleventh document detecting process, as shown in FIG. 18A and FIG. 18B, the light quantity of the projected light onto the detection position is continuously increased, and the amplification factor for the output signal is also continuously increased according to the rate of the continuous increase of the light quantity. The gain shown in FIG. 18B is the amplification factor to further increase the increase of the output value increased by the increase of the light quantity shown in FIG. 18A.

In the example shown in FIG. 18A, the light-emission controller 42 increases the light quantity of the light projected onto the detection position at a constant rate from P/2 to P during a period from time t0 of the start of light emission to time t1. The amplifier 43a increases the gain at a constant rate from G to 2G during the period from t0 to t1. The control of the light quantity of the projected light by the light-emission controller 42 and the setting of the gain of the amplifier 43a may be executed according to, for example, control instructions of the processor 25.

In the example shown in FIG. 18C, since the gain of the amplifier 43a is G at time t0 at which the light quantity of the projected light projected onto the detection position of the document is P/2, the output value obtained by amplifying the output of the photo acceptance element becomes V/2. Besides, in the example shown in FIG. 18C, since the gain of the amplifier 43a is 2G at time t2 at which the light quantity of the projected light projected onto the detection position of the document is P, the output value obtained by amplifying the output of the photo acceptance element becomes 2V. That is, in the example shown in FIG. 18C, the output value obtained by amplifying the output of the photo acceptance element receiving the light shown in FIG. 18A increases at a constant rate from V/2 to 2V (four times larger than V/2) during the period from t0 to t2.

The detection processor 43 of the eleventh document detecting process can remove the stray light by detecting the change corresponding to the continuous increase of the light quantity of the projected light and the continuous increase of the gain of the amplifier in the output value obtained by amplifying the output of the photo acceptance element of the APS sensor. The detection processor 43 to realize the eleventh document detecting process is constructed to output the signal indicating the document detection result (presence or absence of the document) by detecting the change of the output value continuously increasing according to the continuously increasing light quantity and the continuously increasing gain of the amplifier. Since the detection processor 43 to realize the eleventh document detecting process detects the change of the continuously increasing output value, the detection processor can be realized by the same structure as the detection processor to realized the third document detecting process.

However, in the eleventh document detecting process, the light quantity of the projected light is continuously increased, and further, the output value of the amplifier having the continuously increasing gain is processed. Accordingly, the processing circuit 43b of the detection processor 43 to realize the eleventh document detecting process is required to detect the change of the larger output value than the third document detecting process. Thus, a threshold corresponding to the change of the output value continuously increased by a large change amount is set in the processing circuit 43b of the detection processor 43 to realize the eleventh document detecting process.

Next, a twelfth document detecting process will be described.

Figure 19A:
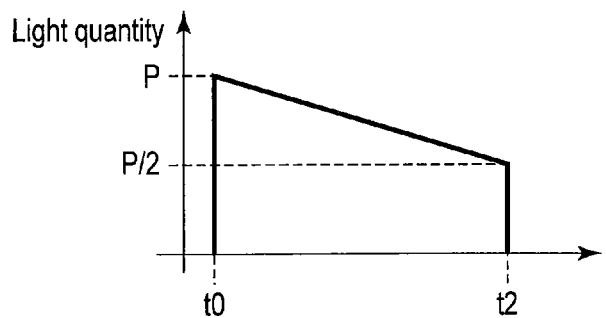
FIG. 19A is a view showing the light quantity of projected light in a twelfth document detecting process.
Figure 19B:
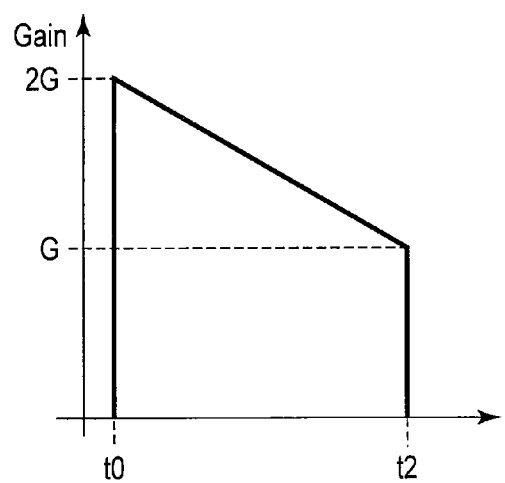
FIG. 19B is a view showing a gain of an amplifier in the twelfth document detecting process.
Figure 19C:
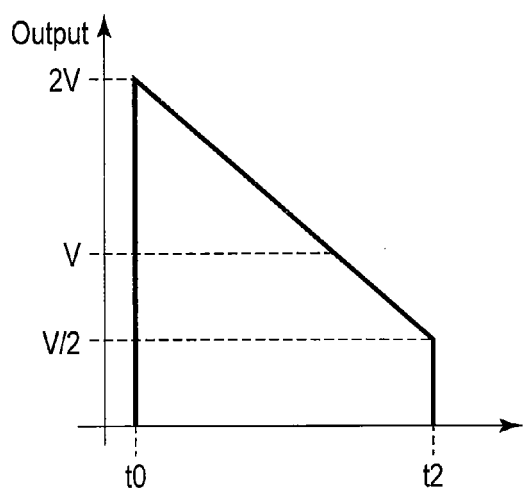
FIG. 19C is a view showing an output value obtained by amplifying an output of a photo acceptance element receiving the light having the light quantity shown in FIG. 19A by the amplifier having the gain shown in FIG. 19B.

FIG. 19A, FIG. 19B and FIG. 19C are views for explaining the twelfth document detecting process. FIG. 19A is a view showing the light quantity of projected light projected onto a detection position. FIG. 19B is a view showing a gain of an amplifier to amplify an output from a photo acceptance element receiving the light having the light quantity shown in FIG. 19A. FIG. 19C is a view showing an output value obtained by amplifying the output of the photo acceptance element receiving the light having the light quantity shown in FIG. 19A by the amplifier having the gain shown in FIG. 19B. That is, the output of the photo acceptance element receiving the light having the light quantity shown in FIG. 19A is amplified by the amplifier having the gain shown in FIG. 19B, and the output value as shown in FIG. 19C is outputted.

In the twelfth document detecting process, as shown in FIG. 19A and FIG. 19B, the light quantity of the projected light onto the detection position is continuously decreased, and the amplification factor for the output signal is also decreased at the timing when the light quantity is continuously decreased. The gain shown in FIG. 19B is the amplification factor to further decrease the output value decreased by the decrease of the light quantity shown in FIG. 19A. In the example shown in FIG. 19A, the light-emission controller 42 decreases the light quantity of the light projected onto the detection position from P to P/2 at a constant rate during a period from time t0 of the start of light emission to time t1. The amplifier 43a decreases the gain from 2G to G at a constant rate during the period from t0 to t1. Incidentally, the control of the light quantity of the projected light by the light-emission controller 42 and the setting of the gain of the amplifier 43a are performed by, for example, control instructions of the processor 25.

In the example shown in FIG. 19C, since the gain of the amplifier 43a is 2G at t0 when the light quantity of the projected light projected onto the detection position of the document is P, the output value obtained by amplifying the output of the photo acceptance element becomes 2V. Besides, in the example shown in FIG. 19C, since the gain of the amplifier 43a is G at time t2 when the light quantity of the projected light projected onto the detection position of the document is P/2, the output value obtained by amplifying the output of the photo acceptance element becomes V/2. That is, in the example shown in FIG. 19C, the output value obtained by amplifying the output of the photo acceptance element receiving the light shown in FIG. 19A decreases at a constant rate from 2V to V/2 (one-fourth larger than 2V) during the period from t0 to t2.

The detection processor 43 of the twelfth document detecting process can remove the stray light by detecting the change corresponding to the continuous decrease of the light quantity of the projected light and the continuous decrease of the gain of the amplifier in the output value obtained by amplifying the output of the photo acceptance element of the APS sensor. The detection processor 43 to realize the twelfth document detecting process is constructed to output the signal indicating the document detection result (presence or absence of the document) by detecting the change of the output value continuously decreasing according to the continuously decreasing light quantity and the continuously decreasing gain of the amplifier. Since the detection processor 43 to realize the twelfth document detecting process detects the change of the continuously decreasing output value, the detection processor can be realized by the same structure as the detection processor to realize the fourth document detecting process.

However, in the twelfth document detecting process, the light quantity of the projected light is continuously decreased, and further, the output value of the amplifier having the continuously decreasing gain is processed. Accordingly, the processing circuit 43b of the detection processor 43 to realize the twelfth document detecting process is required to detect the change of the larger output value than the fourth document detecting process. Thus, a threshold corresponding to the change of the output value continuously decreased by a large change amount is set in the processing circuit 43b of the detection processor 43 to realize the twelfth document detecting process.

As described above, according to the eleventh and the twelfth document detecting process, the light-emission controller continuously changes the light quantity of the projected light for document detection which is projected onto the detection position of the document by the light-emitting element of the APS sensor. The detection processor continuously changes the gain of the amplifier to further amplify the change of the output value corresponding to the change of the light quantity of the projected light, and outputs the signal indicating the presence or absence of the document by detecting the change of the amplified output value. According to the eleventh and the twelfth document detecting process, the high accuracy document detection can be realized in which the output of the stray light other than the projected light for document detection is removed.

As described above, according to the respective embodiments, the document detecting apparatus changes the light quantity of the projected light projected onto the detection position of the document, detects the presence or absence of the change of the output value corresponding to the change of the light quantity in the output value obtained by converting the light from the detection position of the document, and output, as the signal indicating the presence or absence of the document at the detection position of the document, the signal indicating the presence or absence of the change of the output value corresponding to the change of the light quantity. The document detecting apparatus can discriminate between the projected light projected onto the detection position of the document and the stray light other than the projected light, and can realize the high accuracy document detection.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document detecting apparatus comprising:
 a light-emitting element configured to project light onto a detection position of a document and not configured for reading an image of the document;
 a photoelectric conversion element configured to convert light projected onto the detection position into an electric signal and to output the electric signal;

a light-emission controller configured to change a light quantity of the light emitted by the light-emitting element during a predetermined interval; and a detection processor configured to detect a presence or absence of the document at the detection position based on whether a value of the output electric signal during the predetermined interval changes in correspondence to the change of the light quantity caused by the light-emission controller.

2. The apparatus of claim 1, wherein
the light-emission controller stepwise changes the light quantity during the predetermined interval, and
the detection processor detects a stepwise change corresponding to the stepwise changing light quantity in the value of the output electric signal.

3. The apparatus of claim 1, wherein
the light-emission controller continuously changes the light quantity during the predetermined interval, and
the detection processor detects a continuous change corresponding to the continuously changing light quantity in the value of the output electric signal.

4. The apparatus of claim 1, further comprising:
an amplifier to amplify the value of the output electric signal; and
a gain controller to change a gain of the amplifier, wherein
the detection processor detects the change of the value of the output electric signal corresponding to the change of the light quantity and the change of the gain in an output signal from the amplifier.

5. The apparatus of claim 4, wherein
the gain controller changes the gain to cancel the change of the value of the output electric signal corresponding to the change of the light quantity caused by the light-emission controller.

6. The apparatus of claim 5, wherein
the light-emission controller stepwise changes the light quantity during the predetermined interval, and
the gain controller stepwise changes the gain to cancel a stepwise change of the value of the output electric signal corresponding to the change of the light quantity.

7. The apparatus of claim 5, wherein
the light-emission controller continuously changes the light quantity during the predetermined interval, and
the gain controller continuously changes the gain to cancel a continuous change of the value of the output electric signal corresponding to the continuous change of the light quantity.

8. The apparatus of claim 4, wherein
the gain controller changes the gain of the amplifier to further amplify the change of the value of the output electric signal corresponding to the change of the light quantity caused by the light-emission controller.

9. The apparatus of claim 8, wherein
the light-emission controller stepwise changes the light quantity during the predetermined interval, and
the gain controller stepwise changes the gain, to further amplify a stepwise change of the value of the output electric signal corresponding to the change of the light quantity.

10. The apparatus of claim 8, wherein
the light-emission controller continuously changes the light quantity during the predetermined interval, and
the gain controller continuously changes the gain to further amplify a continuous change of the value of the output electric signal corresponding to the change of the light quantity.

11. An image forming apparatus comprising:
a light-emitting element configured to project light onto a detection position of a document and not configured for reading an image of the document;
a photoelectric conversion element configured to convert light projected onto the detection position into an electric signal and to output the electric signal;
a light-emission controller configured to change a light quantity of the light emitted by the light-emitting element during a predetermined interval;
a detection processor configured to detect a presence or absence of the document at the detection position based on whether a value of the output electric signal during the predetermined interval changes in correspondence to the change of the light quantity caused by the light-emission controller;
a image reader configured to read an image of the document detected by the detection processor; and
an image forming unit configured to form the image of the document read by the image reader onto an image forming medium.

12. The apparatus of claim 11, wherein
the light-emission controller stepwise changes the light quantity during the predetermined interval, and
the detection processor detects a stepwise change corresponding to the stepwise changing light quantity in the value of the output electric signal.

13. The apparatus of claim 11, wherein
the light-emission controller continuously changes the light quantity during the predetermined interval, and
the detection processor detects a continuous change corresponding to the continuously changing light quantity in the value of the output electric signal.

14. The apparatus of claim 11, further comprising:
an amplifier to amplify the value of the output electric signal and
a gain controller to change a gain of the amplifier, wherein
the detection processor detects the change of the value of the output electric signal corresponding to the change of the light quantity and the change of the gain in an output signal from the amplifier.

15. The apparatus of claim 14, wherein
the gain controller changes the gain to cancel the change of the value of the output electric signal corresponding to the change of the light quantity caused by the light-emission controller.

16. The apparatus of claim 15, wherein
the light-emission controller stepwise changes the light quantity during the predetermined interval, and
the gain controller stepwise changes the gain to cancel a stepwise change of the value of the output electric signal corresponding to the change of the light quantity.

17. The apparatus of claim 15, wherein
the light-emission controller continuously changes the light quantity during the predetermined interval, and
the gain controller continuously changes the gain to cancel a continuous change of the value of the output electric signal corresponding to the continuous change of the light quantity.

18. The apparatus of claim 14, wherein
the gain controller changes the gain of the amplifier to further amplify the change of the value of the output electric signal corresponding to the change of the light quantity caused by the light-emission controller.

19. The apparatus of claim 18, wherein
the light-emission controller stepwise changes the light quantity during the predetermined interval, and the gain controller stepwise changes the gain to further amplify a stepwise change of the value of the output electric signal corresponding to the change of the light quantity.

20. A document detecting method comprising:
projecting light onto a detection position of a document with a light-emitting element that is different from a light source for reading an image of the document;
converting light projected onto the detection position into an electric signal;
outputting the electric signal;
changing a light quantity of the light projected onto the detection position during, a predetermined interval;
detecting a presence or absence of the document at the detection position based on whether a value of the output electric signal during the predetermined interval changes in correspondence to the change of the light quantity; and
outputting a signal indicating a presence or absence of the document at the detection position based on the detected presence or absence of the document.

\* \* \* \* \*